United States Patent
Sawatani et al.

(10) Patent No.: US 7,048,311 B2
(45) Date of Patent: May 23, 2006

(54) LID LOCK APPARATUS FOR GLOVE BOX

(75) Inventors: Seiji Sawatani, Kanagawa (JP); Masahiro Najima, Kanagawa (JP)

(73) Assignee: Piolax Inc., Yokohama (JP)

( * ) Notice: Subject to any disclaimer, the term of this patent is extended or adjusted under 35 U.S.C. 154(b) by 0 days.

(21) Appl. No.: 10/736,993

(22) Filed: Dec. 17, 2003

(65) Prior Publication Data

US 2004/0168487 A1   Sep. 2, 2004

(30) Foreign Application Priority Data

Dec. 18, 2002  (JP) .................... P. 2002-366293
Nov. 27, 2003  (JP) .................... P. 2003-397051

(51) Int. Cl.
*E05C 1/00*   (2006.01)

(52) U.S. Cl. .......................... 292/33; 292/32

(58) Field of Classification Search .............. 292/8, 292/11, 24, 25, 26, 32, 33, 34, 35, 36, 37
See application file for complete search history.

(56) References Cited

U.S. PATENT DOCUMENTS

| | | | | |
|---|---|---|---|---|
| 1,865,205 A | * | 6/1932 | Palmquist | 292/37 |
| 5,688,000 A | * | 11/1997 | Dolman | 292/34 |
| 6,120,069 A | * | 9/2000 | Taranto | 292/35 |
| 6,152,512 A | * | 11/2000 | Brown et al. | 296/37.12 |
| 6,672,632 B1 | * | 1/2004 | Speed et al. | 292/25 |
| 6,776,441 B1 | * | 8/2004 | Liu | 292/26 |

FOREIGN PATENT DOCUMENTS

| | | |
|---|---|---|
| DE | 44 00 628 A1 | 7/1995 |
| GB | 2 363 423 A | 12/2001 |
| JP | 58-39347 | 9/1981 |
| JP | 4-60079 | 2/1992 |
| JP | 2003-31420 | 11/2003 |
| WO | WO 95/27115 | 10/1995 |

* cited by examiner

*Primary Examiner*—Gary Estremsky
(74) *Attorney, Agent, or Firm*—McGinn IP Law Group, PLLC

(57) ABSTRACT

A lid lock apparatus for a glove box is attached to inside of a lid to engage hook portions with the glove box. The lid lock apparatus includes a swing member a swing axis of which is rotatably supported by a lid of the glove box; a pair of lock arms, which are disposed in a symmetrical manner with respect to the swing axis, extend in a horizontal direction, and each includes the hook portion at a tip end thereof; and a subassembly member for bringing the lock arms close to each other and forming the lock arms and the swing member in a subassembly. The swing member is disposed in a symmetrical manner with respect to the swing axis and includes a pair of cam grooves extending with slanting. The lock arms include cam pins for engaging with the cam grooves to move the lock arms in opposite directions.

12 Claims, 21 Drawing Sheets

LID LOCK APPARATUS FOR GLOVE BOX

BACKGROUND OF THE INVENTION

1. Field of the Invention

The present invention relates to a lid lock apparatus for a glove box, which is attached to the lid of the glove box thereby to hold the closed state of the lid.

2. Description of the Related Art

In general, as a lid lock apparatus for holding the closed state of the lid of a glove box provided at the instrument panel of a vehicle, there are a center lock system which engages the center portion of the upper end of the lid with the glove box and a side lock system in which a pair of hooks are provided at the upper portions of the left and right sides of the lid and both the hooks are engaged with the glove box to maintain the closed state of the lid. In the case where the width of the lid is relatively large, in the center lock system, when the lid is closed, the degree of unevenness or difference between the surface of the instrument panel and the surface of the lid is large at both ends due to restriction at a center of an upper end of the lid. Thus, the side lock systems in which the degree of unevenness or difference between the surface of the instrument panel and the surface of the lid is small are employed in many cases.

As the lid lock apparatus employing the side clock system, Japanese Unexamined Utility Model Application Publication No.Hei.5-67544, for example, discloses a technique that a pair of left and right hooks disposed at the upper portions of the both sides of a lid are coupled to each other through a link mechanism and the link mechanism is coupled to an operation lever attached to the surface of the lid, whereby when the operation lever is pulled, a pair of the left and right hooks are interlocked thereby to cancel the engagement of both the hooks with respect to the glove box.

In this manner, the lid lock apparatus of the side lock system requires the link mechanism for interlocking a pair of the left and right hooks. The hooks and the link mechanism are attached separately to the lid in the assembling processes.

However, the lid lock apparatus disclosed in the aforesaid publication is arranged in a manner that in the assembling processes, a pair of the hooks and the link mechanism for coupling both the hooks are attached within the lid, so that there arise disadvantages that the number of the assembling processes increases and the cost of a product becomes high. Further, after the assembling, it is required to perform such an adjustment for smoothly moving both the hooks, so that the number of the assembling processes further increases and the cost of product becomes further high.

Further, since the respective parts constituting the hooks and the link mechanism are delivered at every parts, there arise disadvantages that the pats are likely lost and the management of the parts becomes complicated.

SUMMARY OF THE INVENTION

Accordingly, an object of the invention is to provide a lid lock apparatus for a glove box in which the assembling thereof can be made easily, the adjustment after the assembling is easy, the number of working processes in the assembling processes is reduced to reduce the cost of a product and the management of the parts can be made easily.

In order to attain the aforesaid object, a first aspect of the invention provides a lid lock apparatus for a glove box, which is attached to inside of a lid to engage hook portions with the glove box. The lid lock apparatus includes a swing member a swing axis of which is rotatably supported by a lid of the glove box; a pair of lock arms, which are disposed in a symmetrical manner with respect to the swing axis, extend in a horizontal direction, and each includes the hook portion at a tip end thereof; and a subassembly member for bringing the lock arms close to each other and forming the lock arms and the swing member in a subassembly. The swing member is disposed in a symmetrical manner with respect to the swing axis and includes a pair of cam grooves extending with slanting. The lock arms include cam pins for engaging with the cam grooves to move the lock arms in opposite directions.

According to the first aspect of the invention, since the subassembly member holds both the lock arms in a state that both the lock arms are shrunk, thereby to bring the lock arms and the swing member into the compacted subassembly state, the parts of the apparatus are prevented from being separated at the time of delivering and so the parts can be managed easily.

In a second aspect of the invention, the swing member includes a lever portion extending outwardly in a diameter direction. The subassembly member includes a spring one end of which is engaged with the lever portion and the other end of which is engaged with the lock arm.

According to the second aspect of the invention, since the pair of lock arms can be biased in the directions of pulling to each other, the swing member and the lock arms can be brought into the compacted subassembly state easily.

In the third aspect of the invention, the hook portions are biased and engaged with the glove box when the one end of the spring is changed in an engagement destination thereof to the lid from the lever portion.

According to the third aspect of the invention, since both the lock arms can be biased in such a direction that both the lock arms engage with the glove box through the swing member by merely changing the engagement destination of the one end of the spring to the lid from the lever portion, the assembling procedure can be simplified.

In a fourth aspect of the invention, the lock arm includes a pin, which is pushed by the lever portion to move the lock arms in pulling directions to each other thereby to release the engagement between the hook portion and the glove box.

According to the fourth invention, since the pin provided at the lock arm is pushed by the lever portion formed at the swing member, the rotation of the swing member is transmitted to the lock arms efficiently, so that the engagement between the lid and the glove box can be released smoothly.

In a fifth aspect of the invention, the subassembly member includes a spring one end of which is engaged with one of the lock arms and the other end of which is engaged with the other of the lock arms.

According to the fifth aspect of the invention, since the pair of lock arms are biased in pulling directions to each other by directly engaging the spring between the pair of lock arms, it can be performed more firmly to bring the swing member and the lock arms into the subassembly state.

In a sixth aspect of the invention, the hook portion is biased and engaged with the glove box when the one end of the spring is changed in an engagement destination thereof to the lid from the lock arm.

According to the sixth aspect of the invention, since both the lock arms are biased in a direction of being engaged with the glove box through the swing member by merely changing the engagement destination of one end of the spring to the lid from the lock arm, the assembling procedure can be simplified.

In a seventh aspect of the invention, the subassembly member includes rods provided at the lock arms and guide portions provided at the lock arms, for holding the rod of the counterpart lock arm slidably.

According to the seventh aspect of the invention, at the time of shrinking the pair of lock arms to each other, since the lock arms can be shrunk while holding the rods by the guide portions, the assembling procedure of the subassembly can be performed easily.

In an eighth aspect of the invention, the subassembly member includes rods provided at the lock arms and engagement portions provided at the lock arms, for snap-fitting with the rod of the counterpart lock arm.

According to the eighth aspect of the invention, since each of the pair of lock arms can be held in a state of being shrunk by the engagement portion which snap-fits the rod of the counterpart lock arm, it can be performed with simple procedures to bring the swing member and the lock arms into the compacted subassembly state.

In a ninth aspect of the invention, the subassembly member includes rods provided at the lock arms, guide portions provided at the lock arms, for holding the rod of the counterpart lock arm slidably, and engagement portions for snap-fitting the rods and the guide portions.

According to the ninth aspect of the invention, at the time of shrinking a pair of the lock arms to each other, since the lock arms can be shrunk while holding the rods by the guide portions and the snap-fitting is performed in this state, the assembling procedure of the subassembly can be performed more easily.

In a tenth aspect of the invention, the subassembly member includes rods provided at the lock arms, guide portions provided at the lock arms, for holding the rod of the counterpart lock arm slidably, and engagement portions for snap-fitting the swing member and the lock arm.

According to the tenth aspect of the invention, at the time of shrinking the pair of lock arms to each other, since the lock arms can be shrunk while holding the rods by the guide portions and in this state such a condition can be held that the swing member and the respective lock arms are made snap-fitting and shrunk, it can be performed with simple procedures to bring the swing member and the lock arms into the compacted subassembly state.

In an eleventh aspect of the invention, the rods slide with the guide portions when the hook portions are engaged with the glove box.

According to the eleventh aspect of the invention, since the rod slides with the guide portion at the time of the procedure, the lock arms can be moved smoothly in the opposite directions.

According to the embodiment of the invention, the swing member and the lock arms are brought into the compacted subassembly state in advance. Thus, the respective constituent parts of the lid lock apparatus can be prevented to be missed in advance, so that the management of the parts can be made easily. In addition, the assembling of the lid lock apparatus is facilitated. Furthermore, the adjustment of the lid lock apparatus after the assembling can be scarcely required. Thus, the working processes required for assembling the lid lock apparatus can be reduced to a large extent. The cost of a product can be reduced due to the reduction of the number of the working processes.

DETAILED DESCRIPTION OF THE PREFERRED EMBODIMENT

Figure 1:
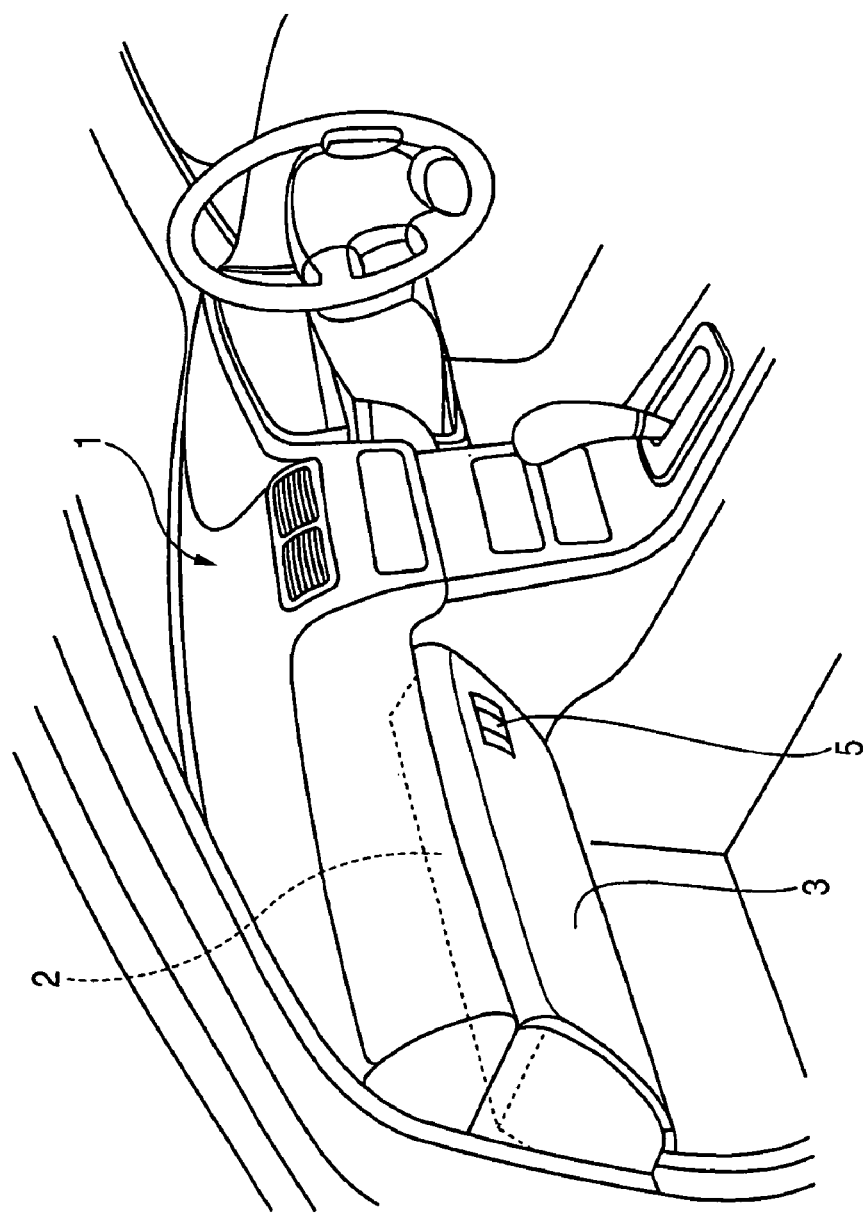
FIG. 1 is a perspective view showing the instrument panel of an automobile.

Hereinafter, the embodiment of the invention will be explained with reference to the accompanying drawings. FIG. 1 is a perspective view showing the instrument panel of an automobile.

A glove box 2 is provided at the passenger seat side of an instrument panel 1 disposed at the front portion within a compartment of an automobile. A lid 3 is provided at an opening portion of the glove box 2. The lid 3 is supported at the lower portions of the both sides thereof so as to rotate freely by a lower edge of the opening portion of the glove box 2 through a supporting member such as a hinge. When the lid 3 is rotated around the supporting member, the opening portion of the glove box 2 is opened and closed.

Figure 2:
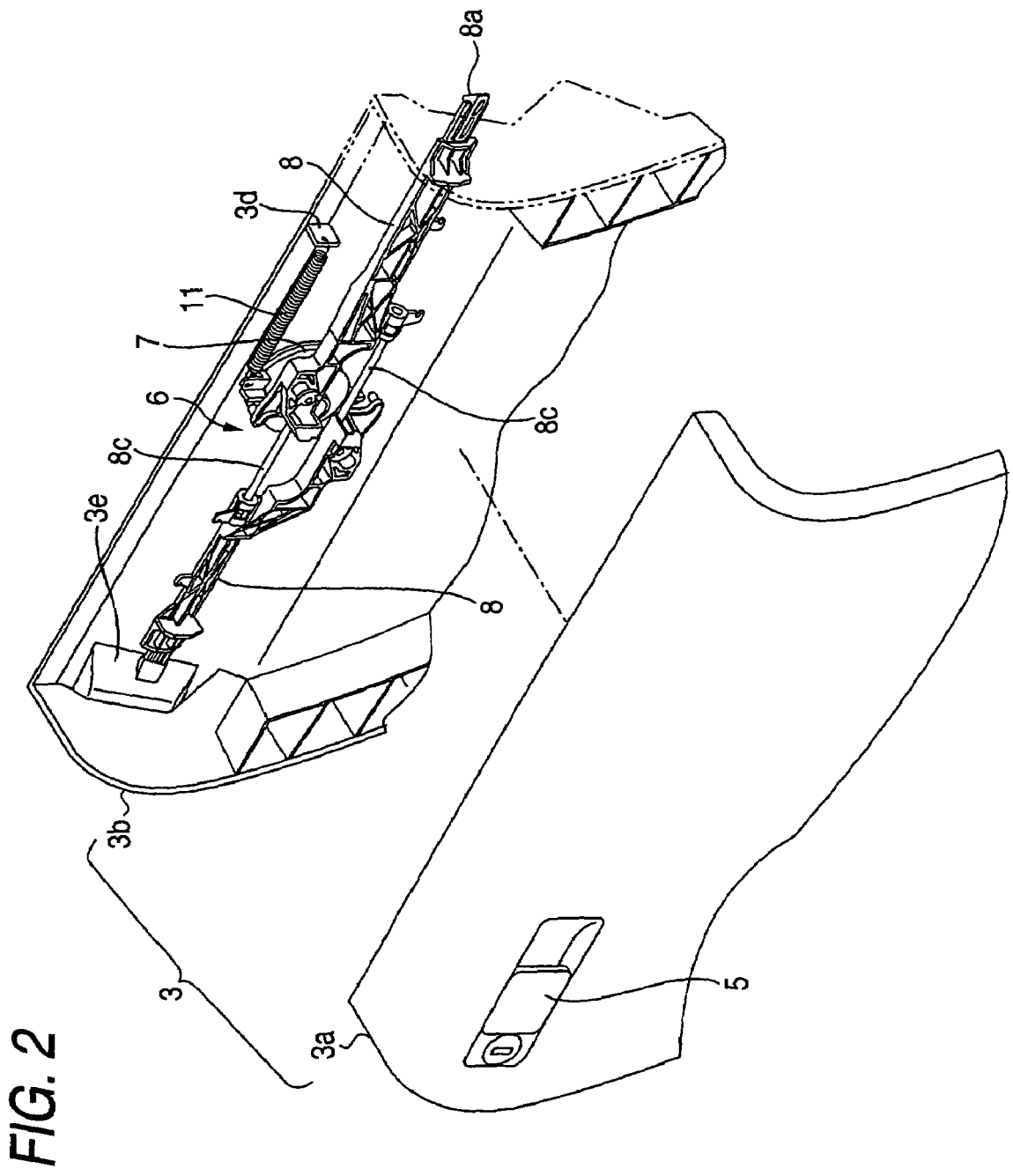
FIG. 2 is an exploded perspective view of a lid of a lid lock apparatus according to one embodiment of the invention.

As shown in FIG. 2, the lid 3 includes a lid outer panel 3a a surface of which faces to the vehicle compartment and a lid inner panel 3b attached to an inner surface of the lid outer panel 3a. The lid outer panel 3a and the lid inner panel 3b form a hollow portion therein. An operation lever 5 is provided at a left side of an upper portion of the lid outer panel 3a. On the other hand, the lid lock apparatus 6 is attached to an inner surface (a surface facing to the hollows portion side) of the upper portion of the lid inner panel 3b.

Figure 4:
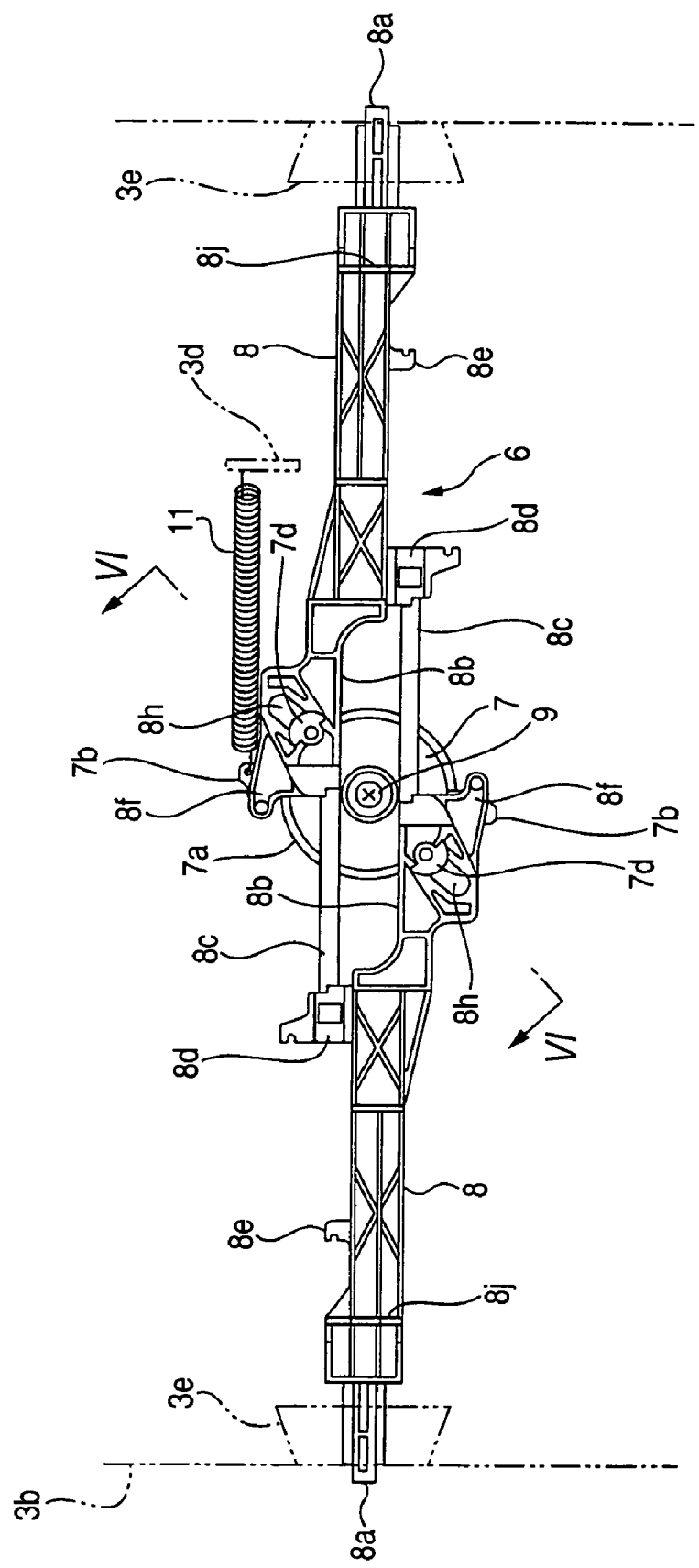
FIG. 4 is a front view showing a state where a side lock module is attached to a lid inner panel in the embodiment.
Figure 5:
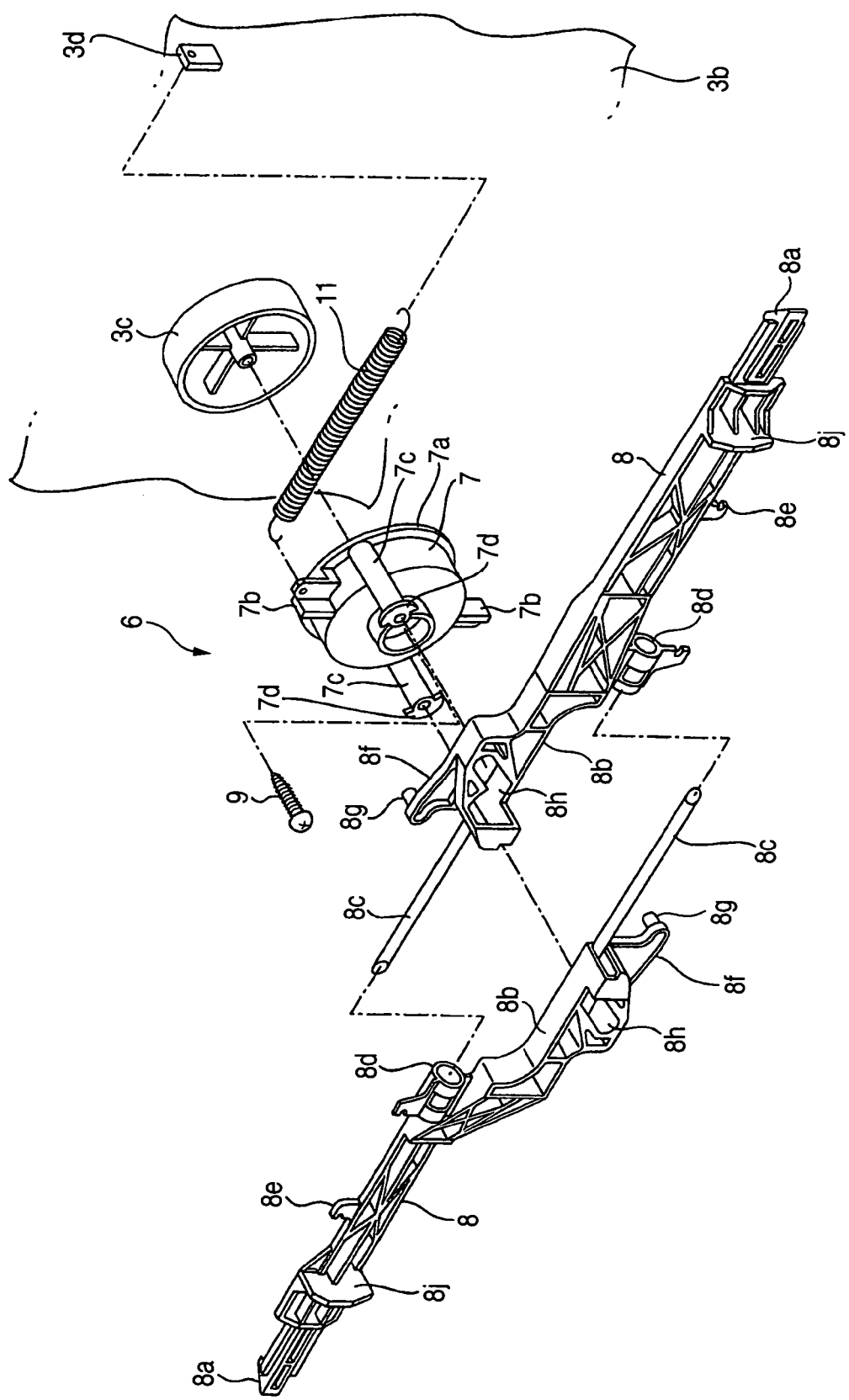
FIG. 5 is an exploded perspective view of a side lock module of the embodiment.

As shown in FIGS. 4 and 5, the lid lock apparatus 6 includes a swing member 7 and a pair of lock arms 8, 8 having the same shape. The swing member 7 is formed in a cylindrical shape and has a flange portion 7a at the opening end thereof (see FIG. 8). A pair of L-shaped lever portions 7b are formed at positions on the outer periphery of the swing member 7 symmetrically with respect to a swing axis of the swing member 7, respectively. A pair of cam pins 7c is provided to protrude from the flange portion 7a along the swing axis direction of the swing member 7, at positions shifted in a clockwise direction of FIG. 4 by a predetermined angle with respect to the pair of L-shaped lever portions 7b, respectively. A semicircular shaped flange 7d is integrally formed at a tip end of each of the pair of cam pins 7c.

A hub 3c protrudes from a center portion in a width direction of the inner surface of the upper portion of the lid inner panel 3b. The hub 3c covers the outer periphery of the swing member 7 thereby to support the swing member 7 swingably. The swing axis of the swing member 7 is engaged with the axis of the hub 3c through a screw 9 so as not to be drawn out therefrom.

On the other hand, as shown in FIG. 4, the pair of lock arms 8, 8 are disposed symmetrically with respect to the swing axis of the swing member 7 so as to extend in opposite directions along the horizontal direction with respect to the lid 3. A line connecting hook portions 8a respectively formed at the tip ends of the lock arms 8, 8 passes through the swing axis of the swing member 7 and extends in the horizontal direction. Both the lock arms 8, 8 slide in an interlocked manner with the rotation of the swing member 7 in parallel to each other in directions of pulling or repelling to each other, that is, in opposite directions to each other. A step portion 8b is formed at a base portion of each of lock arms 8, 8 so as to prevent both the lock arms 8, 8 from interfering to each other when the lock arms 8, 8 slide in the directions of pulling to each other.

A rod 8c protrudes from a rear end of the step portion 8b. When both the lock arms 8, 8 are disposed symmetrically with respect to the swing axis of the swing member 7, the step portions 8b of both the lock arms 8, 8 are disposed oppositely each other through the swing axis of the swing member 7 supported by the screw 9, and further each of the rods 8c extends into a side surface of the other of the lock arms 8, 8. A rod guide portion 8d into which the rod 8c is inserted is provided at the side surface of each of the lock arms 8, 8. When both the lock arms 8, 8 are slid, the rod 8c formed at one of the lock arms 8, 8 is supported by the rod guide portion 8d formed at the other of the lock arms 8, 8, so that both the lock arms 8, 8 are allowed to slide in the horizontal direction.

An engagement nail 8e for engaging one end of a return spring 11 described later is formed on a tip end from the rod guide portion 8d at the side surface of the lock arm 8 where the potion 8d is formed.

Further, as shown in FIG. 5, an arm portion 8f is integrally formed at the rear end of the step portion 8b of the lock arm 8. A pin 8g protrudes from a tip end portion of the arm portion 8f on a surface facing to the swing member 7. In a state described in a later embodiment where the lock arm 8 is assembled with the swing member 7, the pin 8g of the arm portion 8f is disposed on a movement path of the L-shaped lever portion 7b and in a movement direction (a counter-clockwise direction of FIG. 5) of the L-shaped lever portion 7b when the swing member 7 swings against the biasing force of the spring 11.

Furthermore, the step portion 8b includes a cam groove 8h which the cam pin 7c formed at the swing member 7 is inserted into and engaged with. One end of a return spring 11 is engaged with the tip end of one (an upper side of FIG. 4 in this embodiment) of the L-shaped lever portions 7b formed at the swing member 7. The other end of the return spring 11 is engaged with an engagement piece 3d protruding from the inner surface of the lid inner panel 3b. As shown in FIG. 4, the engagement piece 3d is disposed at the right side in FIG. 4 with respect to the swing member 7. Thus, when the both ends of the return spring 11 are engaged with the engagement piece 3d and the L-shaped lever portion 7b, a biasing force is always applied to the swing member 7 in the clockwise direction in FIG. 4.

Figure 6:
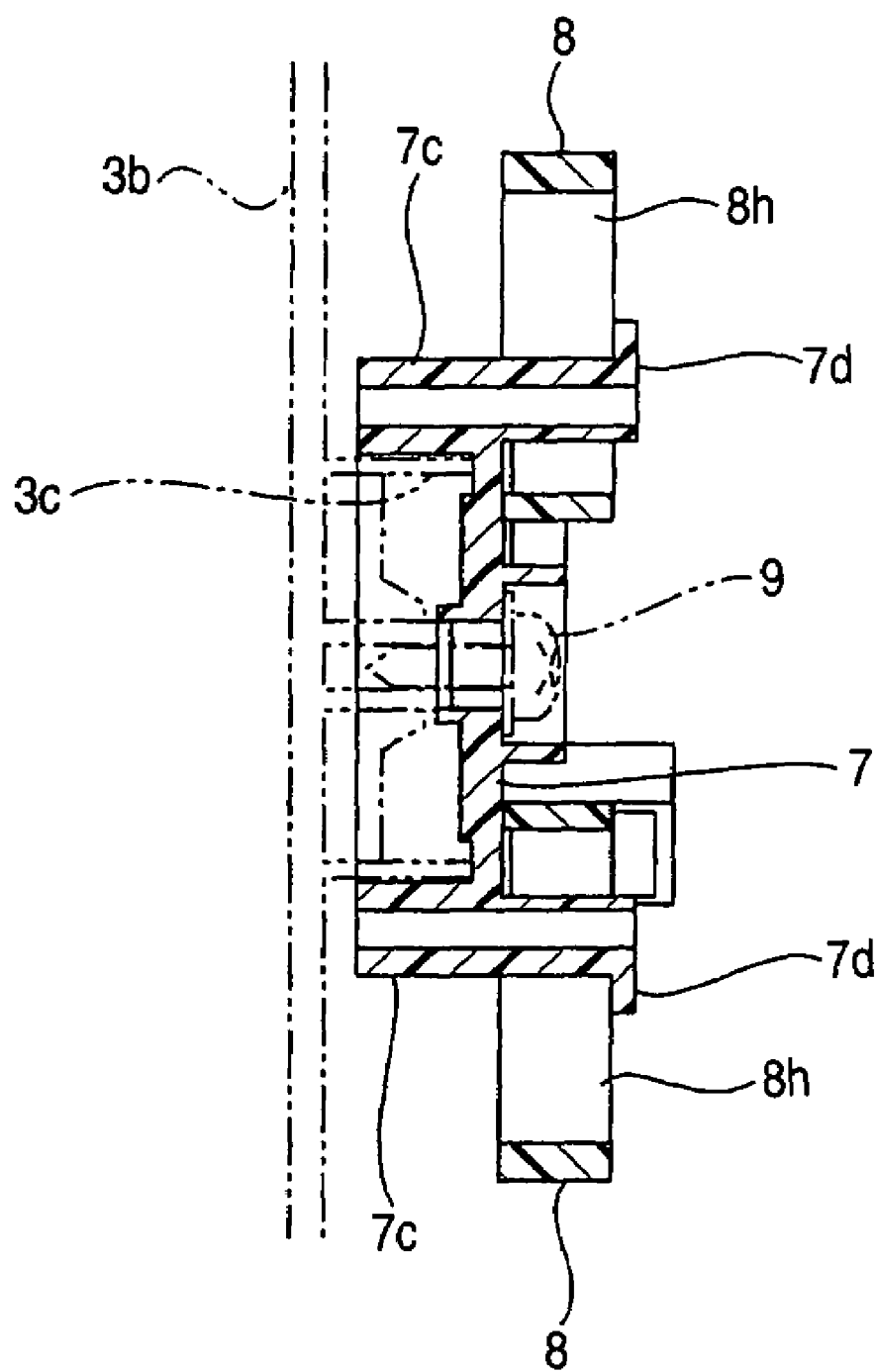
FIG. 6 is a sectional diagram along a line VI-VI in FIG. 4.

As shown in FIG. 6, in a state where the cam pin 7c formed at the swing member 7 is inserted into and engaged with the cam groove 8h formed at the lock arm 8, the semicircular shaped flange 7d formed at the tip end of the cam pin 7c is engaged with the upper surface of the cam groove 8h, whereby the cam pin 7c is prevented from being drawn out from the cam groove. When the lock arm 8 is slid in the horizontal direction, the cam groove 8h acts to rotate the swing member 7 by the cam pin 7c, which is inserted into and engaged with the cam groove 8h. When one of the lock arms 8 is slid, the other lock arm 8 is slid through the swing member 7 in parallel to and in a direction opposing to the one of the lock arms 8.

FIG. 4 shows a state where the swing member 7 and the pair of lock arms 8, 8 are assembled in a predetermined manner at the inner surface of the lid inner panel 3b. In this state, the swing member 7 is biased in the clockwise direction in the figure due to the biasing force of the return spring 11. The biasing force of the swing member 7 in the clockwise direction is transmitted to the cam grooves 8h formed at both the lock arms 8 by the cam pins 7c thereby to slide both the lock arms 8 in the directions of repelling to each other, whereby the hook portions 8a formed at the tip ends of both the lock arms 8, 8 are retractably projected into insertion holes 3f of arm guide portions 3e formed at the both sides of the lid inner panel 3b, respectively.

Figure 3:
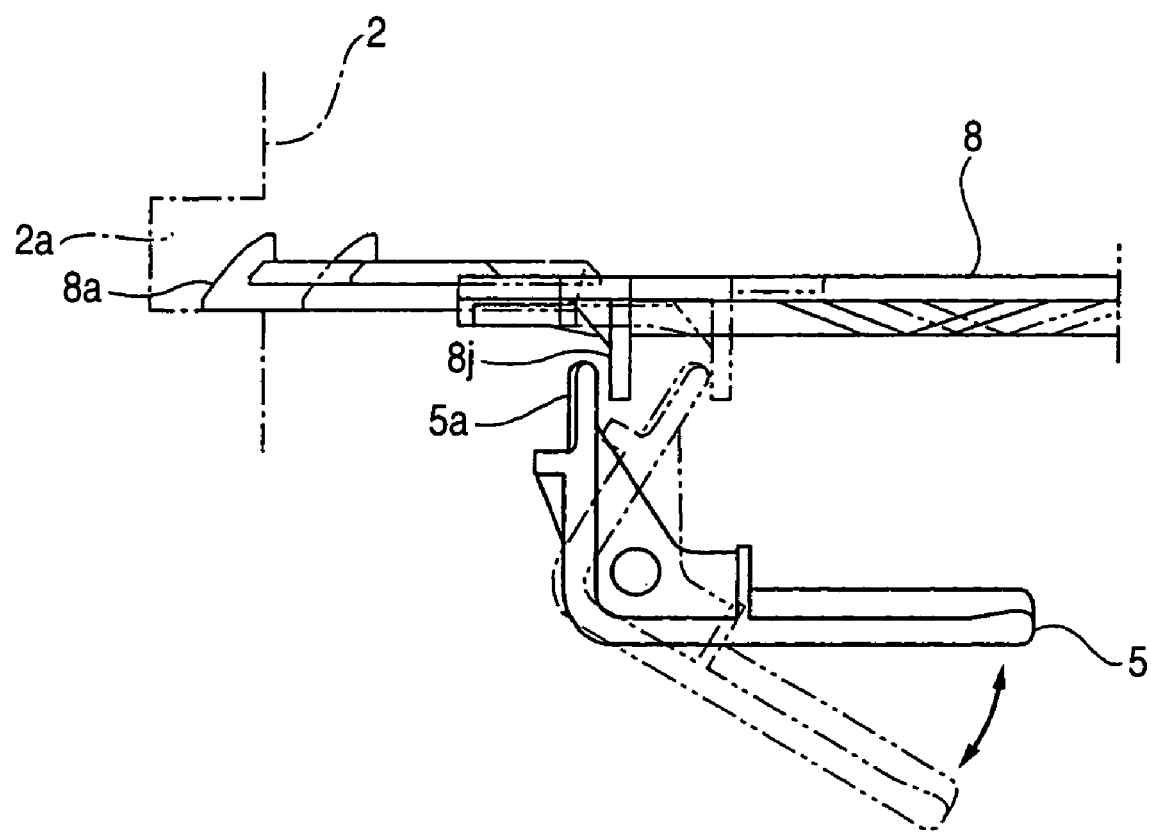
FIG. 3 is a plan view of a main portion showing a relation between a lock arm and an operation lever in the embodiment.

Thus, in a state where the opening portion of the glove box 2 is closed by the lid 3, as shown in FIG. 3, the hook portions 8a formed at the tip ends of both the lock arms 8, 8 are respectively engaged with engagement grooves 2a formed at the both sides of the opening portion of the glove box 2 thereby to maintain the closed state. When the operation lever 5 attached to the lid outer panel 3a is pulled, a lever portion 5a of the operation lever 5 pushes a lever receiving rib 8j formed at the lock arm 8. Thus, each of the lock arms 8, 8 retracts as shown by two-dot chain line as phantom line in FIG. 3. As a result, the hook portion 8a at the tip end of the lock arm 8 is disengaged from the engagement groove 2a formed at the glove box 2.

Next, the explanation will be made as to the action of the lid lock apparatus for the glove box according to this configuration.

At the time of assembling the lid lock apparatus, first, the cam grooves 8h formed at the step portions 8b of both the lock arms 8 are respectively inserted into and engaged with the pair of cam pins 7c protruding along the axis direction of the swing axis from the flange portion 7a of the swing member 7, so that the semicircular shaped flanges 7d protrudes from the upper surfaces of the cam grooves 8h thereby to prevent the cam pins 7c from being drawn out from the cam grooves 8h. Further, the rod 8c protruding from the rear end of the step portion 8b of each of both the lock arms 8 is inserted into the rod guide portion 8d formed at the other of the lock arms 8.

Thus, both the lock arms 8, 8 are linked to each other through the swing member 7. Further, when the rod 8c formed at each of both the lock arms 8, 8 is inserted into the rod guide portion 8d formed at each of the both the lock arms to each other, both the lock arms 8, 8 can be slid in parallel and in opposite directions to each other due to the rotation of the swing member 7.

Figure 8:
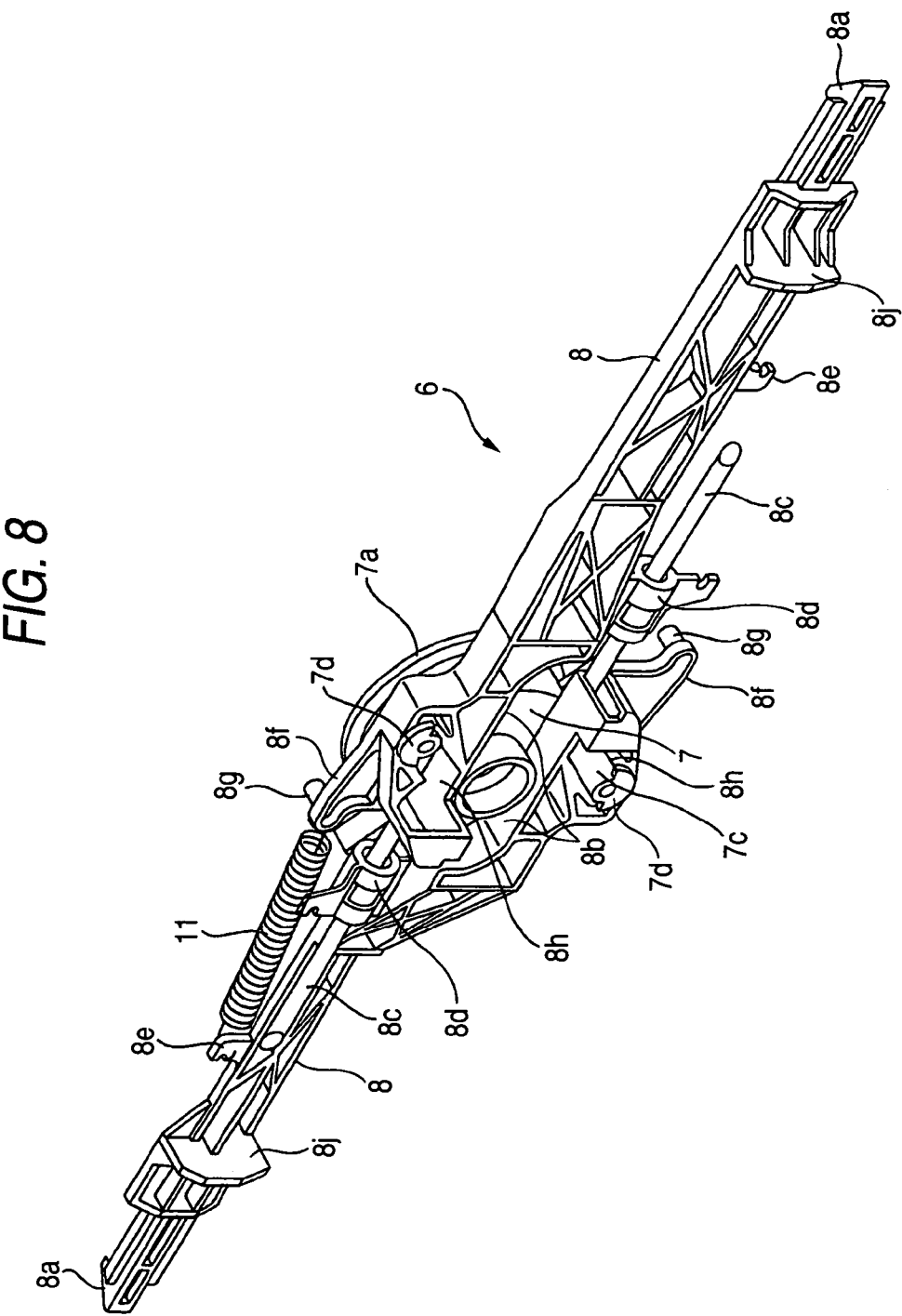
FIG. 8 is a perspective view showing the side lock module at the time of delivering in the embodiment.

Then, at the time of delivering the lid lock apparatus, as shown in FIG. 8, the one end of the return spring 11 is engaged with the tip end of the L-shaped lever portion 7b formed at the swing member 7 and the other end of the return spring 11 is engaged with the engagement nail 8e formed at the lock arm 8 disposed at the left side in FIG. 8.

Then, the swing member 7 rotates in the direction of the lock arm 8, which engages the other end of the return spring 11, due to the biasing force of the return spring 11. Thus, both the lock arms 8, 8 slide in the directions of pulling to each other through the cam grooves 8h which the cam pins 7c protruding from the swing member 7 are inserted into and engaged with, whereby both the lock arms 8, 8 stop in a state that the cam pins 7c are engaged with the end surfaces of the cam grooves 8h.

As a result, as shown in FIG. 8, the rod 8c formed at each of the lock arms 8, 8 is inserted into and supported by the rod guide portion 8d formed at the other of the lock arms 8. Further, the cam grooves 8h formed at both the lock arms 8, 8 are respectively inserted into and engaged with the pair of cam pins 7c formed at the swing member 7. In addition, each of the cam pins 7c is prevented from being drawn out from the cam groove 8h due to the presence of the semicircular shaped flange 7d formed at the tip end of the cam pin. In this specification, this state is referred to that the pair of lock arms 8, 8 and the swing member 7 are brought into a compacted subassembly state.

At the time of attaching the lid lock apparatus thus formed into the subassembly to the lid 3, first, the swing member 7 is attached to the hub 3c formed at the inner surface of the lid inner panel 3b. The swing axis of the swing member 7 is engaged with the axis of the hub 3c through the screw 9 so as not to being drawn out therefrom.

Figure 7:
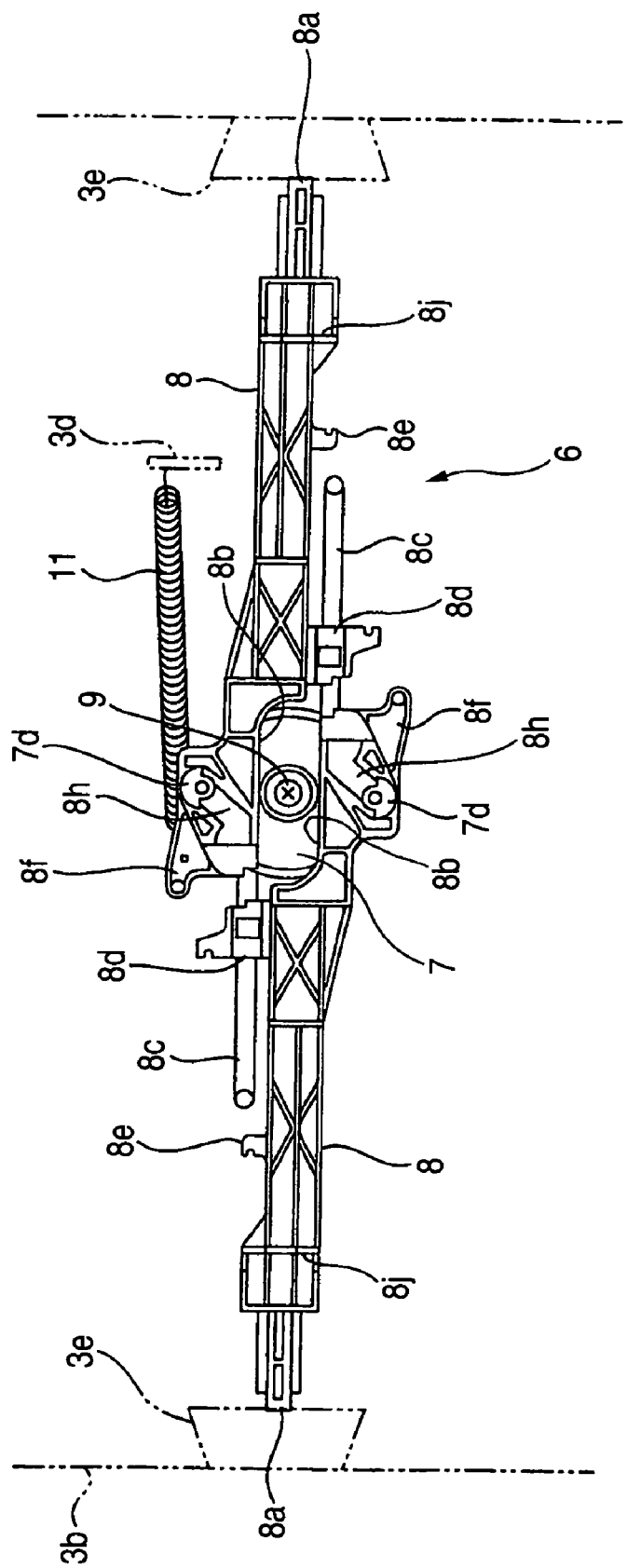
FIG. 7 is a front view explaining a state where the side lock module is being attached to the lid inner panel in the embodiment.

Next, the other end of the return spring 11 is disengaged from the engagement nail 8e of the lock arm 8. As shown in FIG. 7, the other end of the return spring 11 is engaged with the engagement piece 3d protruding from the inner surface of the lid inner panel 3b. At this time, the hook portions 8a formed at the tip ends of both the lock arms 8, 8 are aligned with the arm guide portions 3e formed at the both sides of the lid inner panel 3b, respectively.

Thus, the biasing force of the return spring 11 is applied to the swing member 7 so that the swing member 7 swings clockwise in FIG. 7. At this time, the pair of cam pins 7c formed at the swing member 7 push the cam grooves 8h, 8h formed at the lock arms 8, 8 in the same direction, so that the lock arms 8, 8 are slid in the directions of repelling to each other due to the pushing force applied to the cam grooves 8h, 8h, respectively.

As a result, as shown in FIG. 4, the hook portions 8a, 8a formed at the tip ends of the lock arms 8, 8 protrude from the insertion holes 3f of the both sides of the lid inner panel 3b, respectively, whereby the assembling of the lid lock apparatus is completed.

Next, when the lid inner panel 3b is attached to the lid outer panel 3a in a predetermined manner to complete the erection of the lid 3, the lever receiving rib 8j (formed at the lock arm 8 located on the left side in FIG. 4) is disposed so as to face to the lever portion 5a with offsetting in the operation direction of the lever portion 5a as shown in FIG. 3.

Then, the lid 3 is attached to the opening portion formed at the glove box 2. In a state where the opening portion of the glove box 2 is closed by the lid 3, as shown in FIG. 3, the hook portions 8a, 8a of the lock arms 8, 8 protruding from the both sides of the lid 3 are engaged with the engagement grooves 2a formed at the both sides of the glove box 2, respectively, thereby to maintain the closed state.

In this state, when the operation lever 5 is pulled, the lever portion 5a pushes the lever receiving rib 8j formed at the lock arm 8 illustrated at the left side in FIG. 4 thereby to retract the lock arm 8. Then, the cam grooves 8h formed at the step portions 8b of the lock arms 8 push the cam pins 7c, which are inserted into and engaged with the cam grooves 8h, in the retractive direction.

As a result, the swing member 7 from which the cam pins 7c protrude swings counterclockwise in FIG. 4 against the biasing force of the return spring 11. At this time, the cam groove 8h is engaged with the cam pin 7c loosely. Therefore, before the cam pin 7c on the upper side of the swing member 7 in FIG. 4 pushes the cam groove 8h, the outer surface of the L-shaped lever portion 7b on the upper side of the swing member 7 in FIG. 4 pushes the pin 8G of the other of the lock arms 8, 8 thereby to retract the other lock arm 8 by the pin 8g.

Then, as shown by the two-dot chain line in FIG. 3, both the lock arms 8, 8 slide in the directions pulling to each other. The hook portions 8a, 8a formed at the tip ends of both the lock arms 8, 8 disengage from the engagement grooves 2a formed at the both sides of the glove box 2, respectively. As a result, the lid 8 is placed in a openable state. At this time, the rod 8c formed at one of the lock arms 8 is inserted into the rod guide portion 8d formed at the other of the lock arms 8 and the lock arms 8, 8 are moved while being in a state of being supported in the horizontal direction to each other. Thus, both the lock arms 8, 8 can be protruded and retracted smoothly.

In this manner, according to the embodiment, since the lid lock apparatus is formed into the subassembly, the respective constituent parts of the lid lock apparatus can be prevented to be missed in advance, so that the management of the parts can be made easily. Further, since the lid lock apparatus is assembled with the lid inner panel 3b in the compacted subassembly state, it is not necessary to assemble the lid lock apparatus itself. Thus, not only the number of the working processes required for assembling the lid lock apparatus can be reduced but also the adjustment of the lid lock apparatus after the assembling can be easy. As a result, the cost of a product can be reduced.

Further, after the lid lock apparatus is assembled with the lid inner panel 3b in the predetermined manner, when the lid inner panel 3b is attached to the lid outer panel 3a, the lever receiving rib 8j (formed at the lock arm 8) is disposed so as to face to the lever portion 5 with offsetting in the operation direction of the lever portion 5a. Thus, it is not necessary to interlock the operation lever 5 with the lock arm 8, so that it is also not required to adjust the operation between the operation lever 5 and the lock arm 8. Therefore, the assembling becomes easier due to the elimination of such an adjustment, and so the number of the working processes at the time of assembling can be further reduced.

Further, when the operation lever 5 is operated thereby to retract one of the lock arms 8, the other of the lock arms 8 is pushed by the L-shaped lever portion 7b formed at the swing member 7 and retracted. Thus, the rotation force of the swing member 7 can be transmitted efficiently to the other of the lock arms 8, so that the opening operation of the lid 3 with the operation lever 5 can be performed smoothly.

Figure 9:
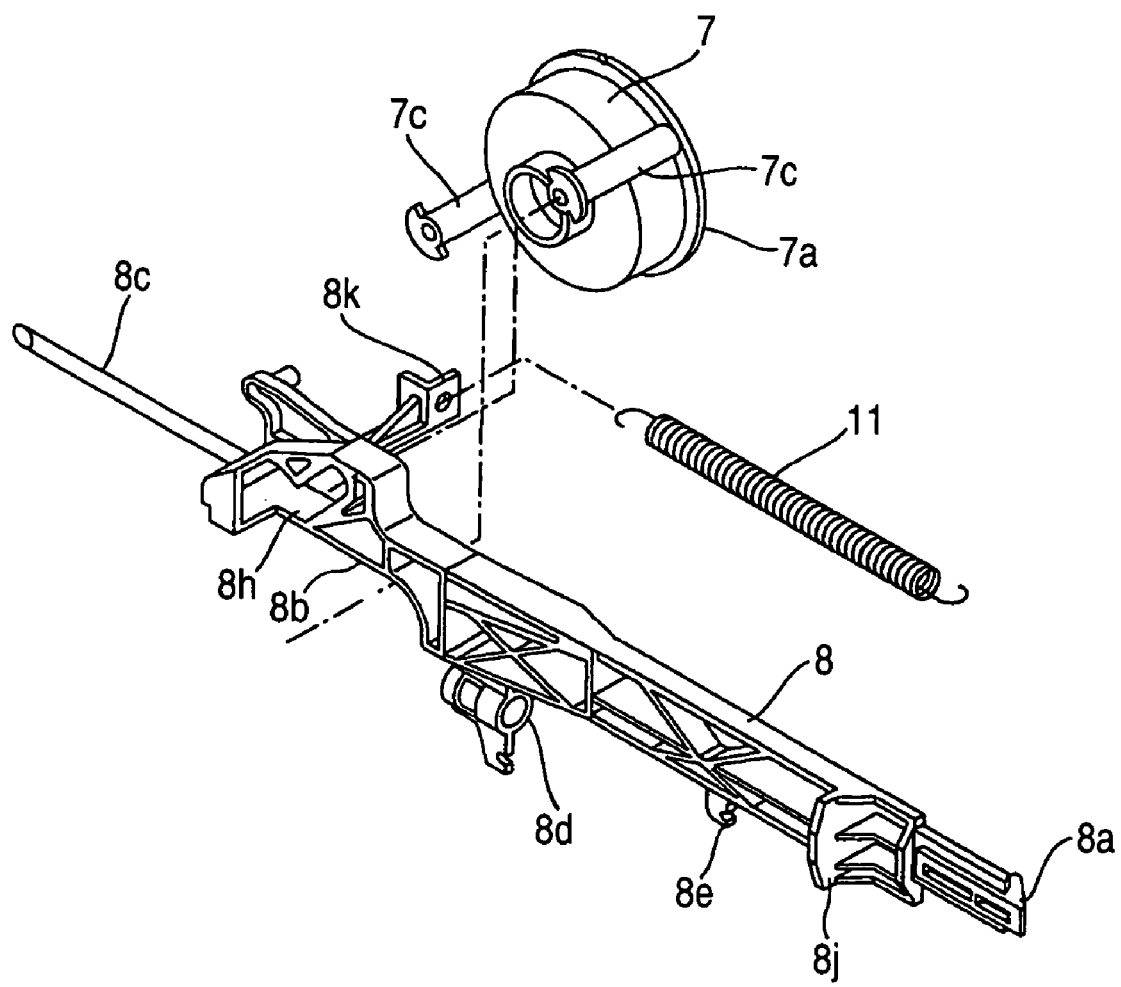
FIG. 9 is a perspective view showing a lid lock apparatus according to another embodiment of the invention.

FIG. 9 shows a lid lock apparatus according to another embodiment of the invention. In the respective embodiments explained hereinafter, portions substantially identical to those of the embodiment shown in FIGS. 1 to 8 are referred to by the common symbols, with explanation thereof being omitted.

This embodiment differs from the aforesaid embodiment in a point that the one end of the return spring 11 is engaged with a bracket 8k protruding from a base end portion of the lock arm 8 and the other end of the return spring 11 is engaged with the engagement nail 8e of the counterpart lock arm 8 thereby to be formed into a subassembly. In this manner, the both ends of the return spring 11 are directly engaged with the pair of lock arms 8 thereby to bias the pair of lock arms 8 in directions of pulling them to each other, respectively, so that the swing member 7 and the lock arms 8 can be brought into the compacted subassembly state more firmly. At the time of attaching this lid lock apparatus to the lid 3, as described above, the other end of the return spring 11 is changed in its engagement destination to the engagement piece 3d. The lock arms 8 are biased so that the hook portions 8a of the lock arms 8 protrude through the insertion holes 3f provided at the both side surfaces of the lid 3, respectively (see FIG. 4).

FIGS. 10 to 16 show a lid lock apparatus according to still another embodiment of the invention.

Figure 10:
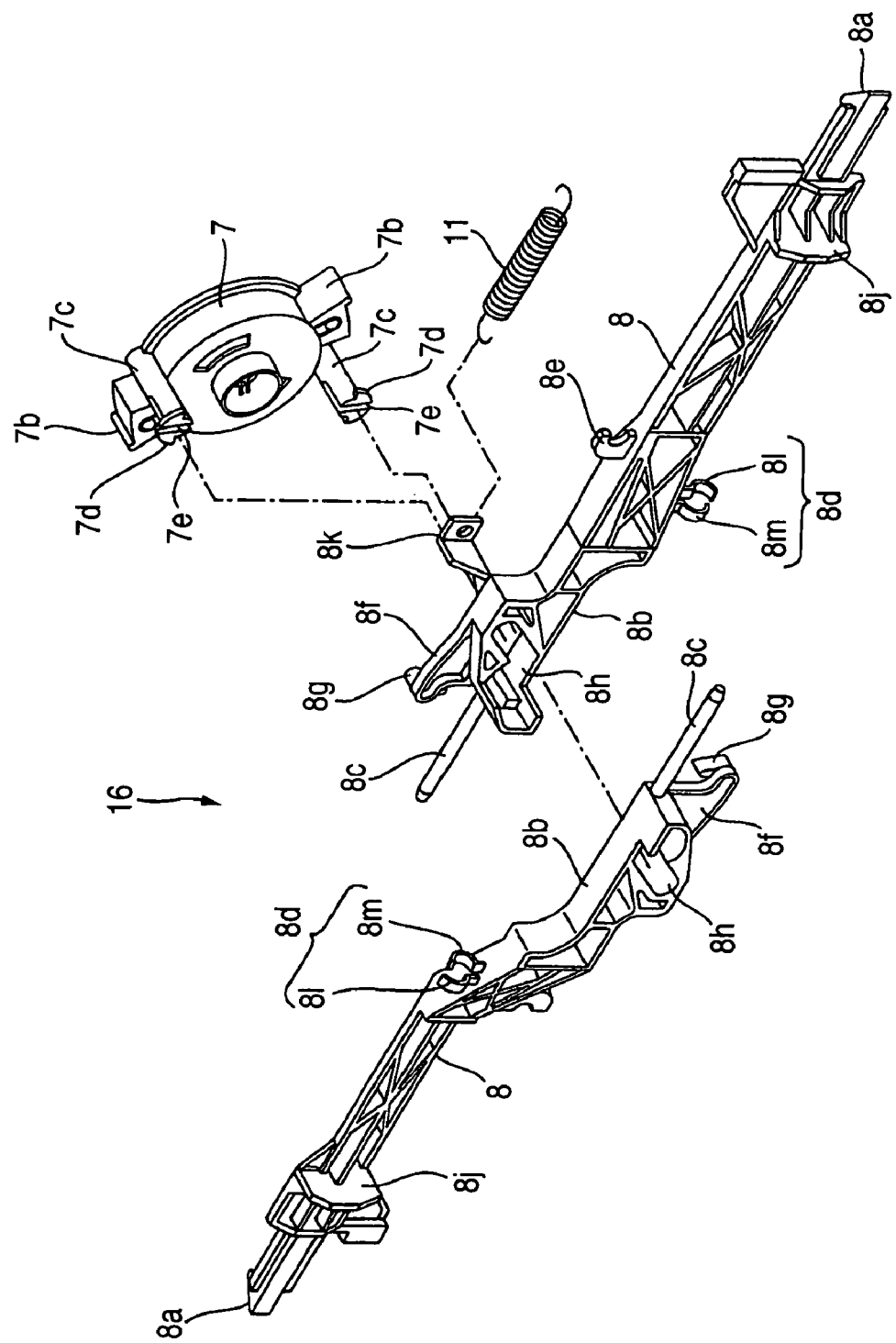
FIG. 10 is an exploded perspective view showing a lid lock apparatus according to a still another embodiment of the invention.

As shown in FIG. 10, in this embodiment, the rod 8c is made shorter. The rod guide portion 8d includes two holding pieces 8l, 8m each having a holding portion of a semicircular shape when viewed from an axial direction of the lock arm 8. Further, the rod 8c is provided with a projection portion 8n, which engages with one of the holding pieces 8l, 8m when the rod 8c is inserted between the holding pieces 8l, 8m.

Figure 11:
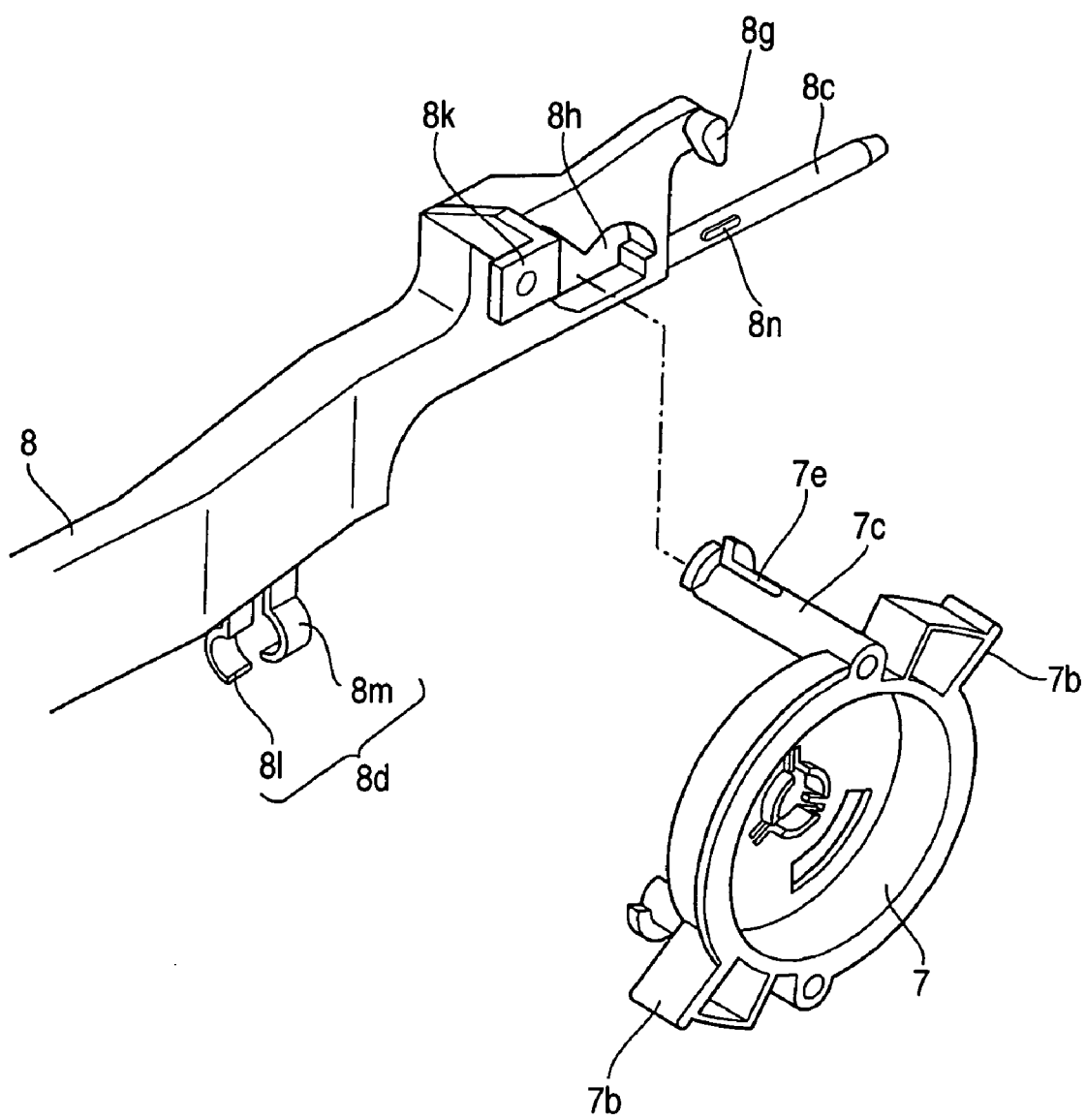
FIG. 11 is an exploded perspective view showing a lock arm and a swing member in the embodiment.
Figure 12:
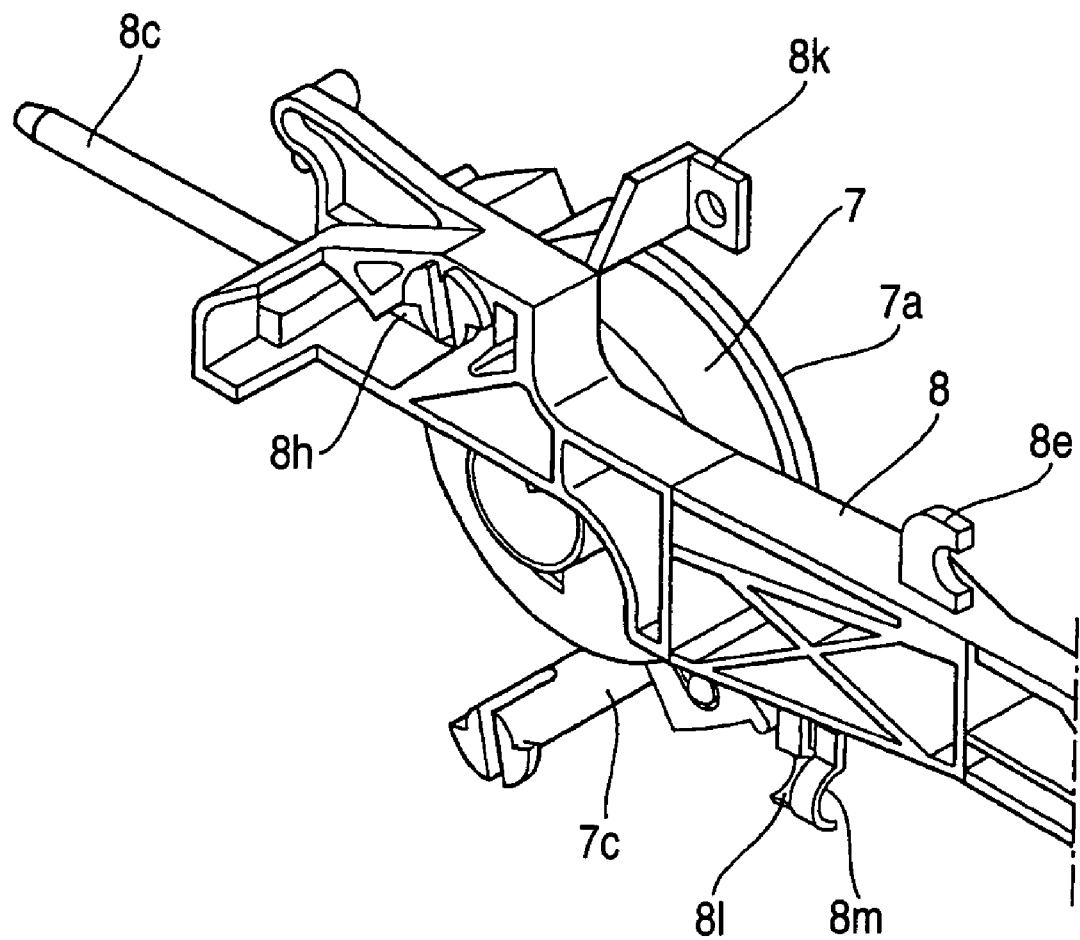
FIG. 12 is a perspective view showing an assembled state of the lock arm and the swing member in the embodiment.

As shown in FIGS. 11 and 12, the pair of lock arms 8 are coupled so as to move freely in opposite directions to each other by inserting the cam pins 7c of the swing member 7 into the cam grooves 8h, respectively.

Figure 13:
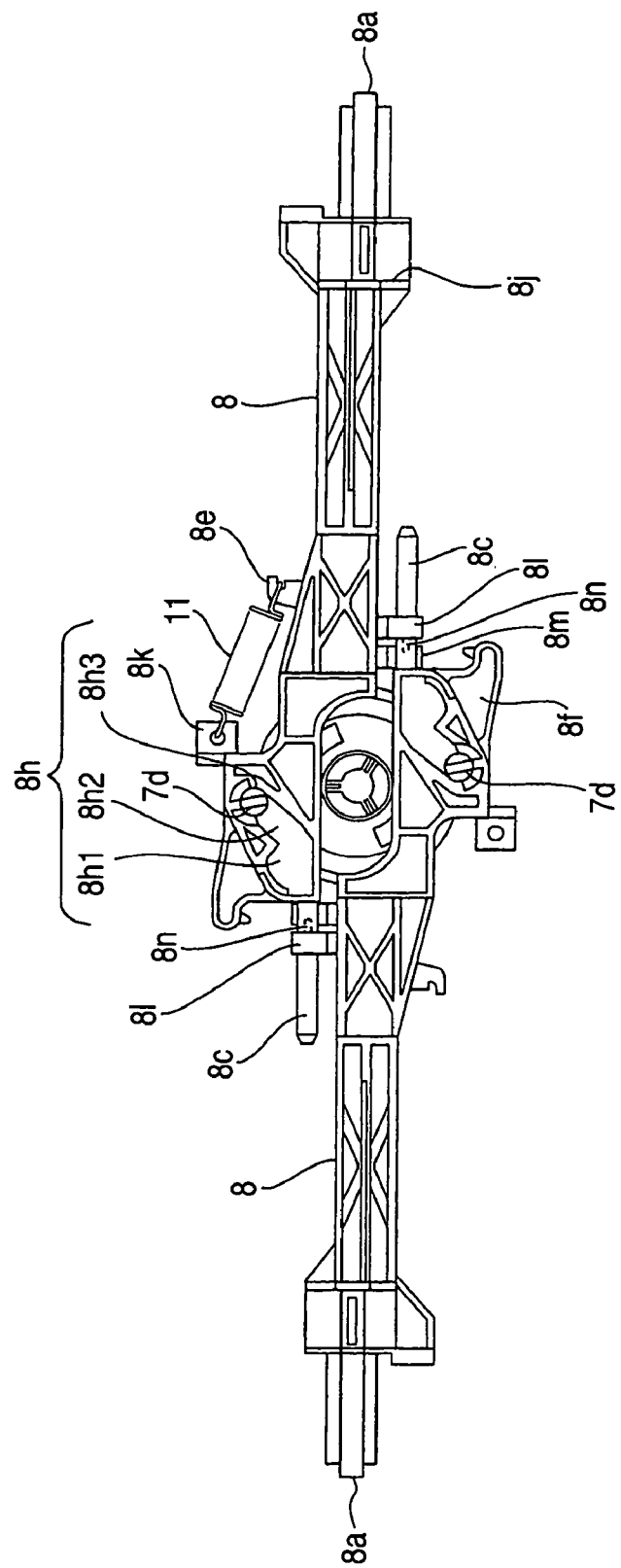
FIG. 13 is a front view showing a subassembly state in the embodiment.

Then, as shown in FIG. 13, when the rod 8c is inserted into the rod guide portion 8d including the holding pieces 8l, 8m thereby to engage the projection portion 8n with one of the holding pieces 8l, 8m, the pair of lock arms 8 are held in an approached state to each other through the swing member 7 thereby to be formed in the subassembly.

Thus, in this embodiment, since it is not necessary to use the return spring 11 as a subassembly member, the return spring 11 is hooked between the bracket 8k and the engagement nail 8e formed at the same lock arm 8.

Figure 14:
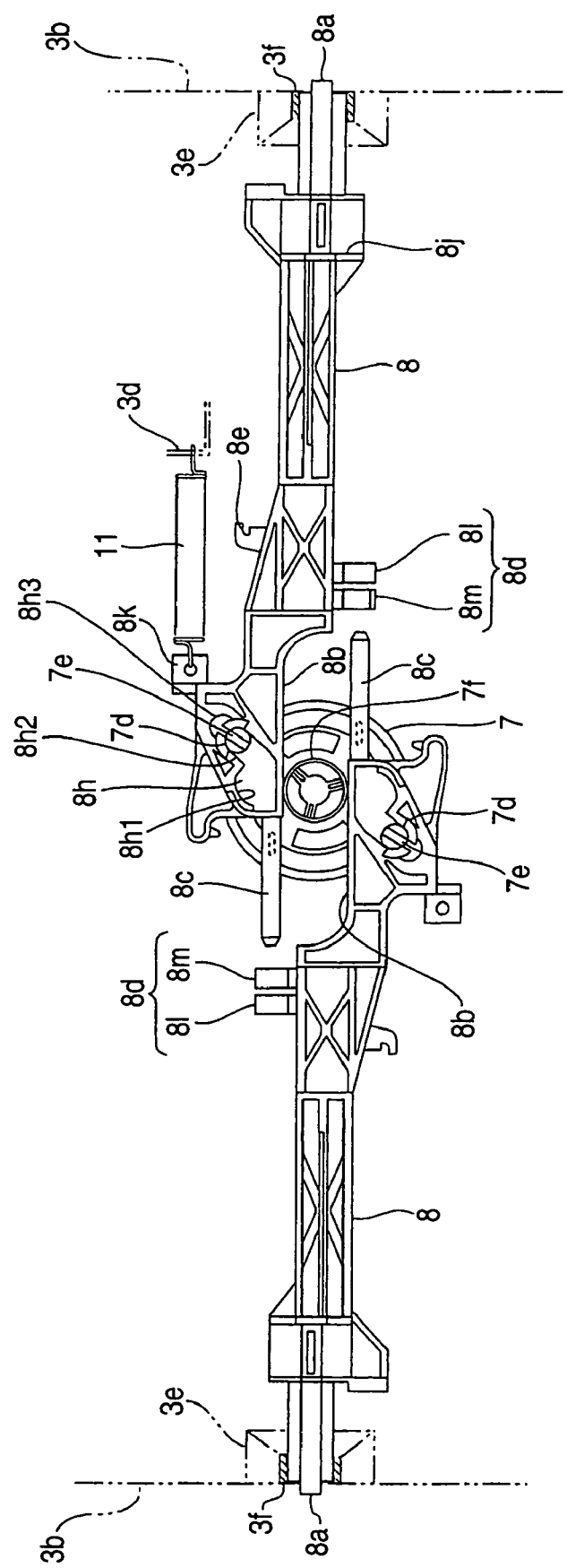
FIG. 14 is a front view showing a locked state in the embodiment.

At the time of attaching to the lid 3, as shown in FIG. 14, the end portion of the return spring 11 hooked on the engagement nail 8e, for example, is disengaged and then merely engaged with the engagement piece 3d provided at the lid 3. In this state, the lock arms 8 are biased so that the hook portions 8a thereof protrude through the insertion holes 3f at the both side surfaces of the lid 3. In this case, since a distance between the engagement nail 8e and the engagement piece 3d is short, the engagement changing procedure of the return spring 11 can be performed easily.

In this embodiment, in the using state where the hook portions 8a of the lock arms 8 are inserted into the insertion holes 3f at the both side surfaces of the lid 3, the rods 8c are drawn out from the guide portions 8d. Therefore, the guide portions 8d cannot guide sliding of the rods 8c. However, the lock arms 8 can be held so as to be slidable by the following configuration.

That is, in FIG. 14, the step portion 8b of each of the lock arms 8 abuts against boss portion 7f formed at the center of the swing member 7. Hence, the pair of lock arms 8 are prevented from approaching to each other any more.

Figure 16:
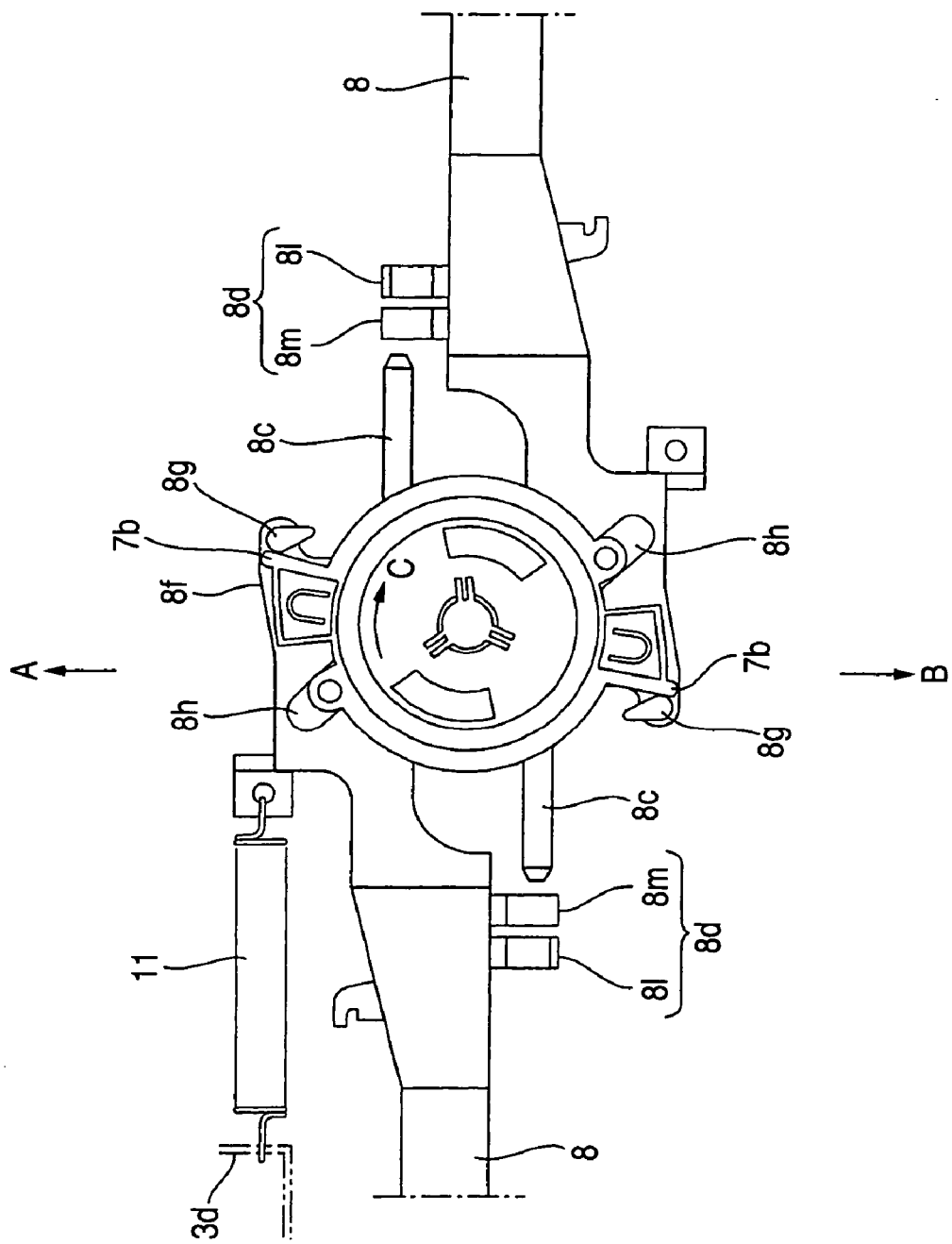
FIG. 16 is an enlarged diagram showing a main portion of the periphery of the swing member in the embodiment.

Further, as shown in FIG. 16, even when the pair of lock arms 8 are tried to move in opposite directions as shown by arrows A and B to open therebetween, since the cam pins 7c of the swing member 7 are inserted into the cam grooves 8h formed in a slanted manner in the lock arms 8, the pair of lock arms 8 cannot be opened unless the swing member 7 rotates in an arrow C direction in FIG. 16.

However, since the lever portions 7b of the swing members 7 abut against the pins 8g formed at the base end portions of the lock arms 8, the pins 8g prevent the swing of the swing member 7 in the arrow C direction. As a result, the pair of lock arms 8 can be slid without being separated in a state where the lock arms 8 are coupled so as to be movable in opposite directions. Each of the pins 8g is formed in a raindrop shape as shown in FIG. 16 when viewed along a rotation shaft of the swing member 7 in order to surely obtain the aforesaid effect of preventing the opening of the lock arms 8 in the operating ranges of the lock arms 8.

In this manner, even in a state where the rods 8c are drawn out from the guide portions 8d, the pair of lock arms 8 can be slid in the opposite directions without being separated.

Figure 15:
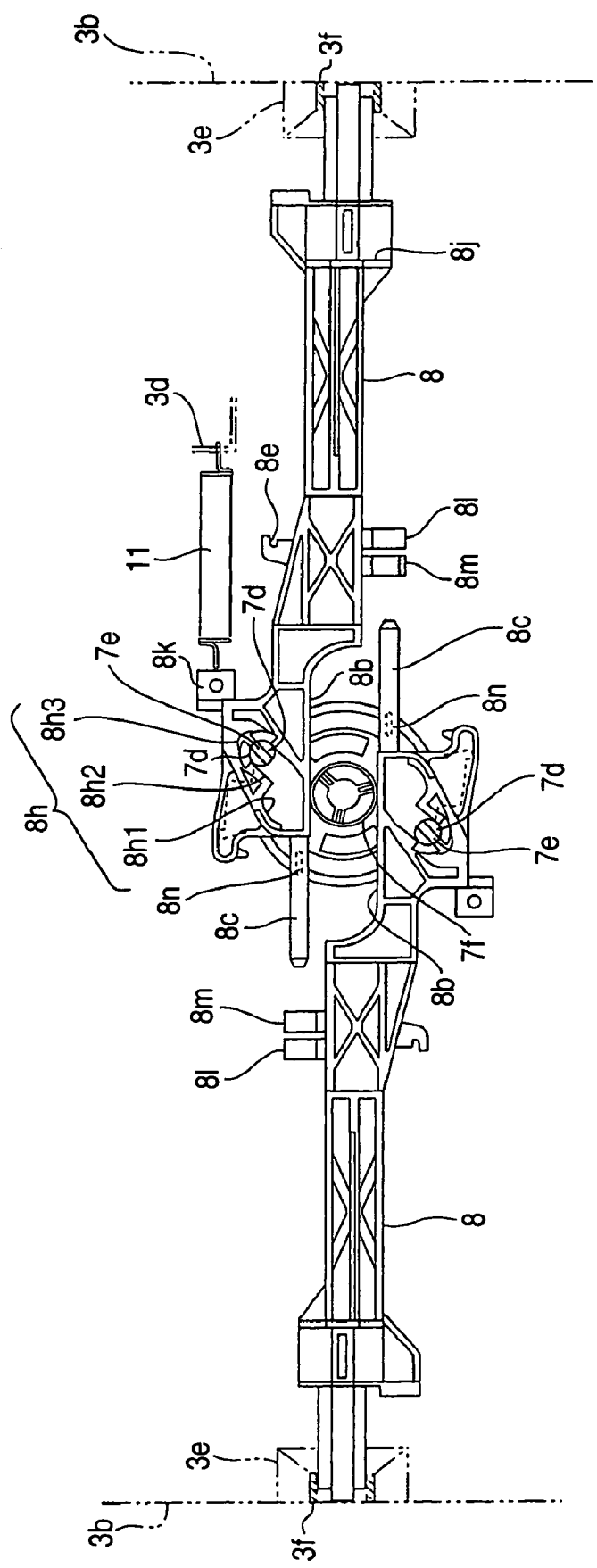
FIG. 15 is a front view showing a lock-release state in the embodiment.

FIG. 14 shows a locking state to the glove box 2, and FIG. 15 shows a state where the hook portions 8a are retracted by the operation lever 5 shown in FIG. 3 thereby to release the locking state.

In this embodiment, as shown in FIGS. 10 and 11, a slit 7e is formed at the tip end portion of each of the cam pins 7c of the swing member 7 along the axial direction of each cap pin 7c so that the tip end portion of each of the cam pin 7c and the semicircular shaped flange 7d is separated into two pieces.

In the operating range of the lock arms 8 shown in FIGS. 14 and 15, since each of the slits 7e is disposed almost along slanted portion 8h2 of the cam groove 8h, the separated two pieces of the cam pin 7c elastically abut against the inner periphery of the cam groove 8h thereby to prevent wobbling.

Further, the one end of the cam groove 8h defines a semicircular shaped opening portion 8h1 for inserting the semicircular shaped flange 7d of the cam pin 7c therein. The intermediate portion of the cam groove 8h forms the slanted portion 8h2. Further, the other end of the cam groove 8h serves as a large diameter portion 8h3 for forming a clearance between the other end and the cam pin 7c in the subassembly state shown in FIG. 13.

In this embodiment, when the rod 8c is extended so that the rod 8c is slidably held by the rod guide portion 8d even in the operation state of the lid lock apparatus, the lock arms are configured in a manner that one of the lock arms 8 can support the other of the lock arms 8, so that the lock arms 8 can slide more smoothly to each other.

Figure 17:
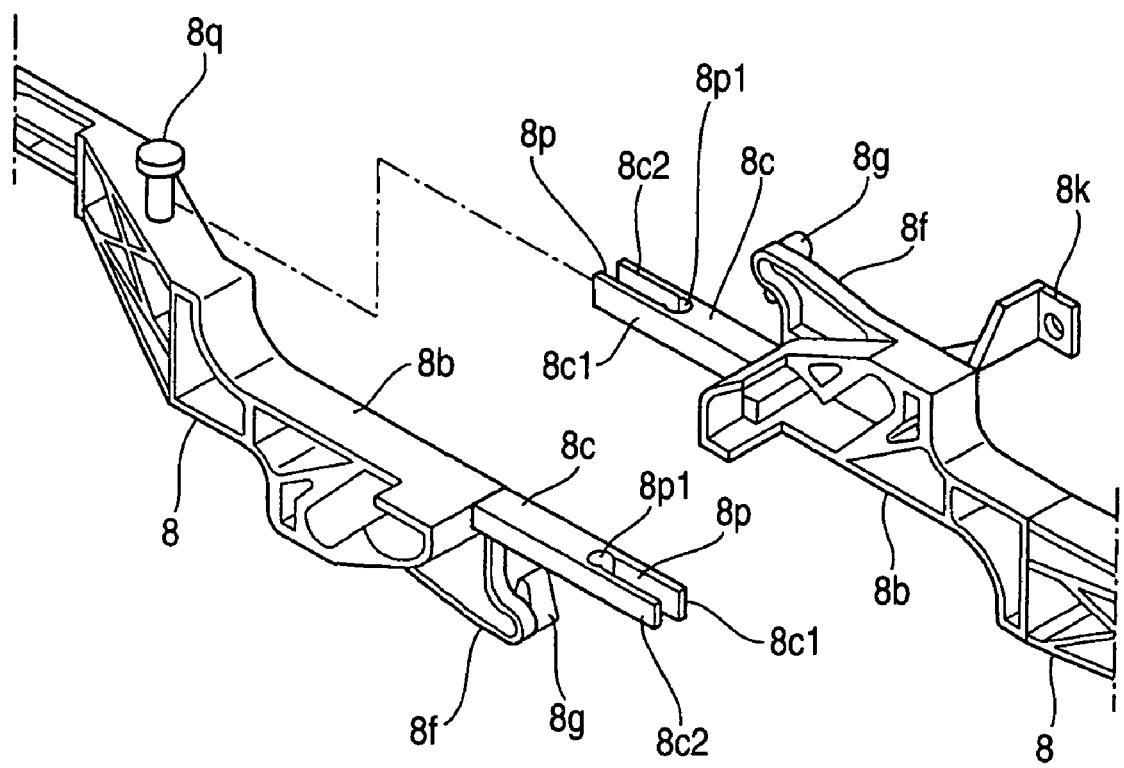
FIG. 17 is a partial perspective view showing a lid lock apparatus according a still another embodiment of to the invention.

FIG. 17 shows the lid lock apparatus according to still another embodiment of the invention. In this embodiment, the rod 8c of each of the lock arms 8 is configured in a polygonal prism shape. A groove 8p is formed at the tip end of the rod 8c along the axial direction of the rod 8c. Thus, the tip end portion forms two plate portions 8c1, 8c2. The groove 8p between the two plate portions 8c1, 8c2 includes a fitting hole 8p1 inner end diameter of which is slightly made large. A guide pin 8q to be inserted into the groove 8p of the partner-side lock arm 8 is provided at the side portion of the lock arm 8 so as to protrude therefrom. The guide pin 8q is provided with a head portion for preventing the two plate portions 8c1, 8c2 from disengaging from the guide pin 8q thereby to restrict the plate portions 8c1, 8c2 in the direction perpendicular to the sliding direction of the rod 8c and the rod guide portion 8d.

Thus, at the time of bringing the swing member 7 and the lock arms 8 into the compacted subassembly state, the guide pin 8q is inserted into the groove 8p of the rod 8c, and the guide pin 8q is pushed into the groove 8p in this state thereby to fit the guide pin 8q into the fitting hole 8p1. As a result, the pair of lock arms 8 can be held in an approached state to each other and the swing member 7 and the lock arms 8 can be brought into the compacted subassembly state.

In this embodiment, when the two plate portions 8c1, 8c2 are extended so that the guide pin 8q is slidably held by the groove 8p between the two plate portions 8c1, 8c2 even in the operation state of the lid lock apparatus, the lock arms are configured in a manner that one of the lock arms 8 can support the other of the lock arms 8, so that the lock arms 8 can be slid more smoothly to each other.

Figure 18:
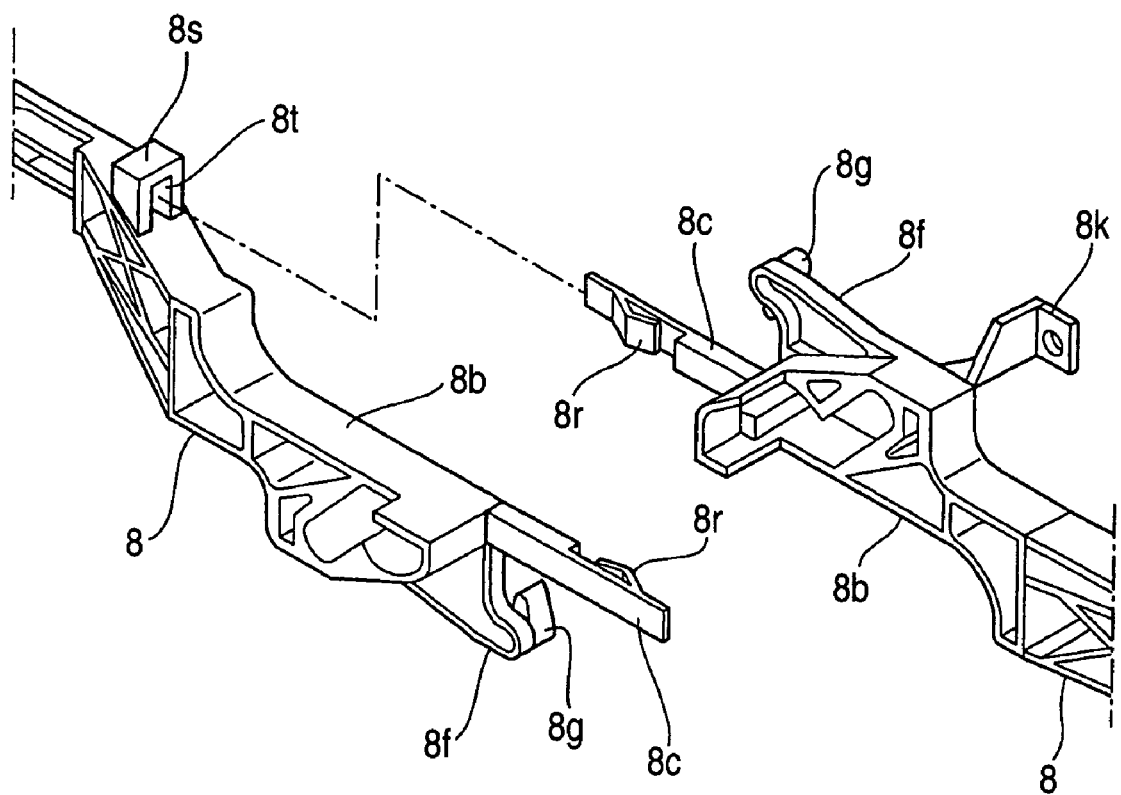
FIG. 18 is a partial perspective view showing a lid lock apparatus according to a still another embodiment of the invention.

FIG. 18 shows a lid lock apparatus according to a still another embodiment of the invention. In this embodiment, the tip end of the rod 8c of each of the lock arms 8 is formed in a thin plate shape. An elastic piece 8r formed in a mountain shape protruding and being bent is formed at the side portion of the tip end portion of the thin plate shape. A projection 8s provided with an engaging hole 8t, in which the tip end portion of the rod 8c is inserted, is formed at the side portion of the counterpart lock arm 8.

Thus, when the tip end portion of the rod 8c of the lock arm 8 is inserted into the engaging hole 8t of the projection 8s, the elastic piece 8r passes through the engaging hole 8t to engage the peripheral edge on the passing-through side, so that a pair of the lock arms 8 can be held in an approached state to each other and the swing member 7 and the lock arms 8 can be brought into the compacted subassembly state.

In this embodiment, when the rod 8c is extended so that the rod 8c is slidably held by the engaging hole 8t even in the operation state of the lid lock apparatus, the lock arms are configured in a manner that one of the lock arms 8 can support the other of the lock arms 8, so that the lock arms 8 can be slid more smoothly to each other.

Figure 19:
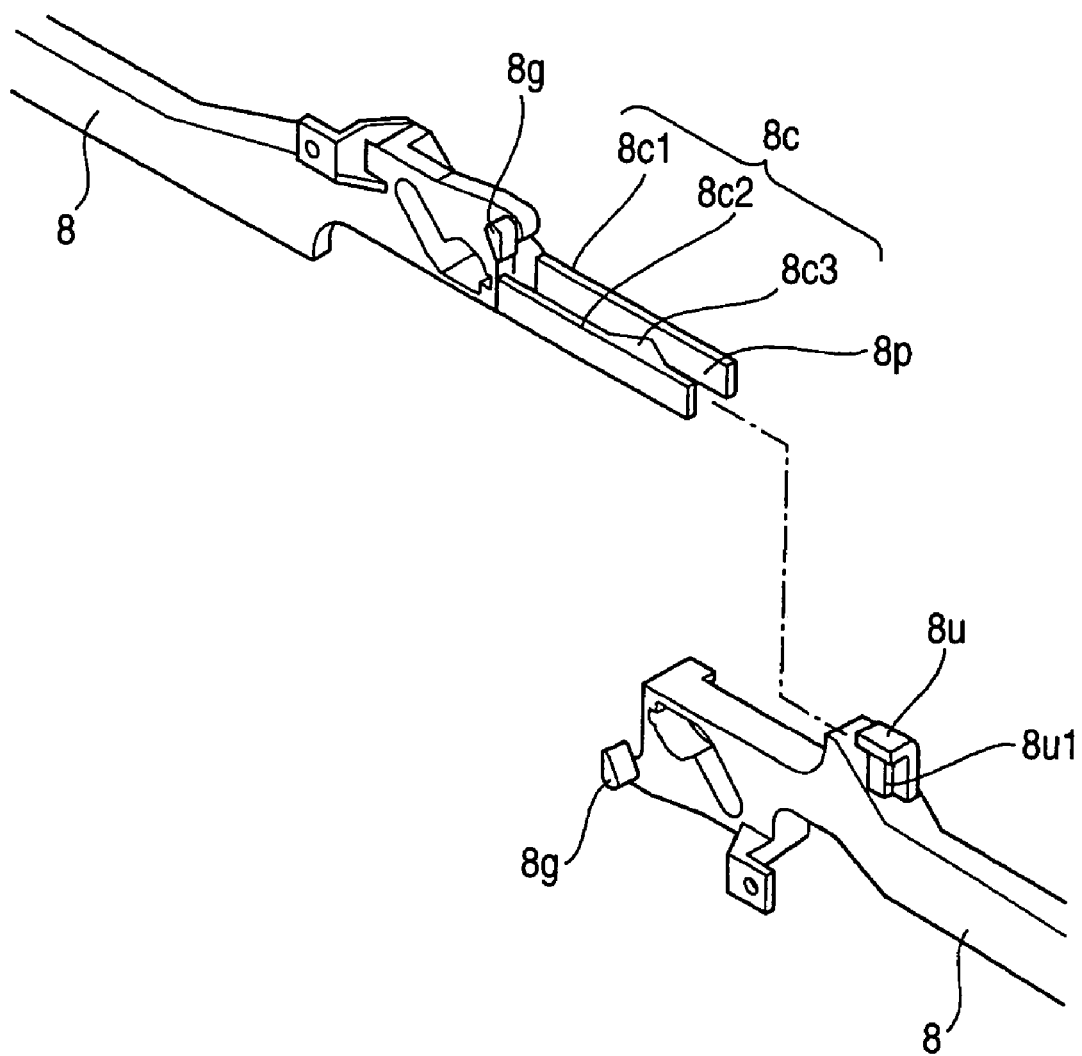
FIG. 19 is a partial perspective view showing a lid lock apparatus according to a still another embodiment of the invention.

FIG. 19 shows a lid lock apparatus according to still another embodiment of the invention. In this embodiment, the rod 8c of each of the lock arms 8 includes two plate portions 8c1, 8c2, which are extended almost in parallel to each other, and a projection portion 8c3 is formed at the inner side surface of the plate portion 8c2. An L-shaped projection portion 8u to be inserted between the plate portions 8c1, 8c2 is provided at the counterpart lock arm 8 so as to protrude therefrom. An engaging step portion 8u1 is formed at the projection portion 8u.

Thus, when the projection portion 8u of one of the lock arms 8 is inserted between the plate portions 8c1, 8c2 of the other of the lock arms 8, the projection portion 8c3 of the plate portion 8c2 engages with the engaging step portion 8u1 of the projection portion 8u. Since the projection portion 8u is formed in the L-shape, the plate portions 8c1, 8c2 are prevented from disengaging from the projection portion 8u thereby to restrict the plate portions 8c1, 8c2 in the direction perpendicular to the sliding direction between the lod 8c and the projection portion 8u. As a result, the pair of lock arms 8 can be held in an approached state to each other and the swing member 7 and the lock arms 8 can be brought into the compacted subassembly state.

In this embodiment, when the two plate portions 8c1, 8c2 are extended so that the projection portion 8u is slidably held between the two plate portions 8c1, 8c2 even in the operation state of the lid lock apparatus, the lock arms are configured in a manner that one of the lock arms 8 can support the other of the lock arms 8, so that the lock arms 8 can be slid more smoothly to each other.

Figure 20:
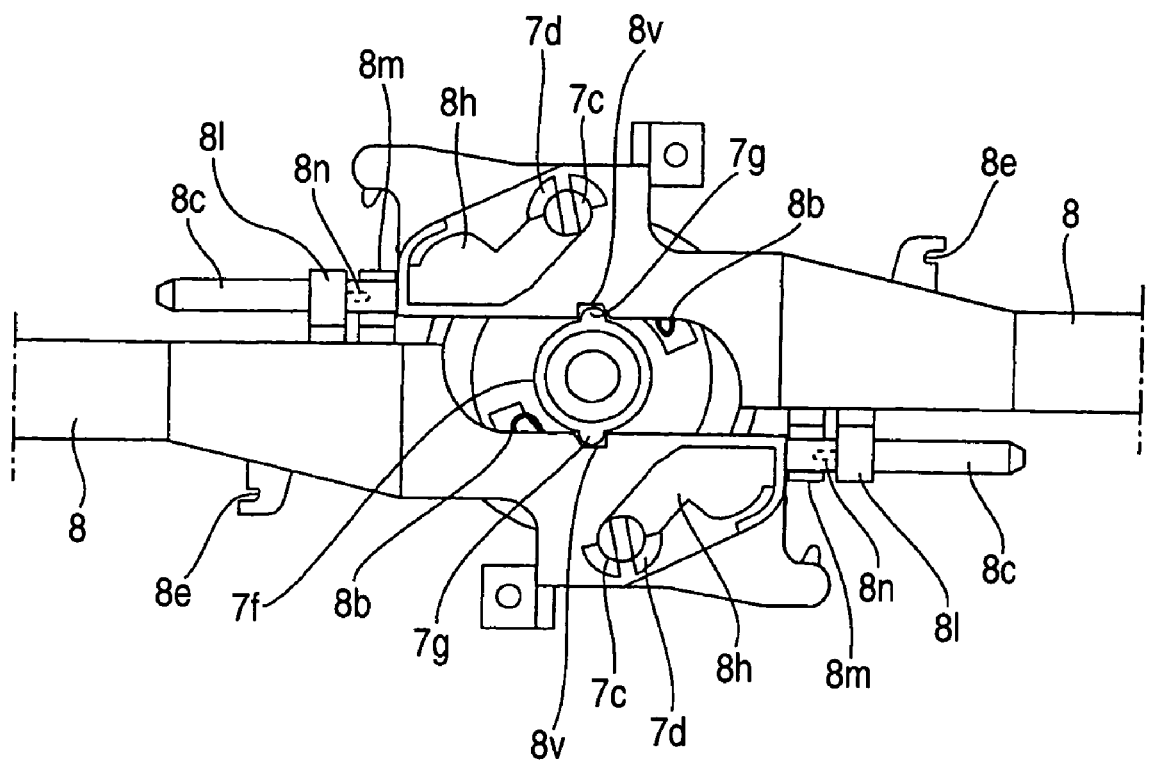
FIG. 20 is an enlarged diagram showing a main portion of the lid lock apparatus according to a still another embodiment of the invention.

FIG. 20 shows a lid lock apparatus according to still another embodiment of the invention. In this embodiment, like the embodiments shown in FIGS. 10 to 16, the rod 8c is formed at the base end portion of each of the lock arms 8 and a projection portion 8n is provided at the rod 8c. A rod guide portion 8d including two holding pieces 8l, 8m is provided at the side portion of each of the lock arms 8. When the rod 8c is inserted into the rod guide portion 8d, the projection portion 8n engages with one of the holding pieces 8l, 8m.

In this embodiment, in addition to the aforesaid engagement structure, two projection portions 7g opposing to each other are formed at the outer periphery of the boss portion 7f of the swing member 7, and grooves 8v are formed in correspondence to these projection portions 7g at the inner surfaces of the step portions 8b of the lock arms 8, respectively. When the rod 8c is inserted into the rod guide portion 8d thereby to engage the projection portion 8n with one of the holding pieces 8l, 8m, the projection portion 7g fits into the groove 8v. As a result, the pair of lock arms 8 can be approached to bring the rotation members 7 and the lock arms 8 are brought into the compacted subassembly state.

Figure 21:
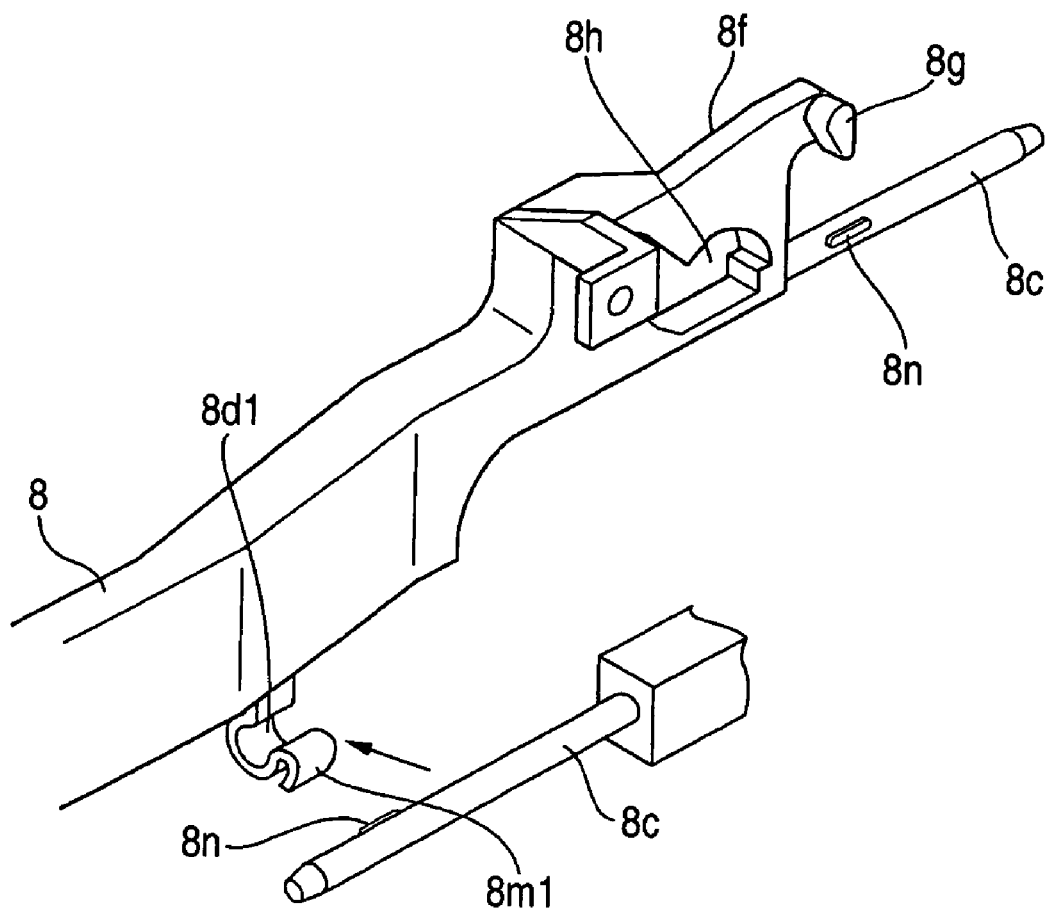
FIG. 21 is a partial perspective view showing a lid lock apparatus according to a still another embodiment of the invention.

In this embodiment, when the rod 8c is extended so that the rod 8c is slidably held by the holding pieces 8l, 8m even in the operation state of the lid lock apparatus, the lock arms are configured in a manner that one of the lock arms 8 can support the other of the lock arms 8, so that the lock arms 8 can be slid more smoothly to each other FIG. 21 shows a lid lock apparatus according to still another embodiment of the invention. This embodiment is basically similar to the embodiments shown in FIGS. 10 to 16 but differs in the shape of a rod guide portion 8d1. That is, it has the tip end portion 8m1 bent outwardly and fill opening portion in the side direction of the lock arm 8. As a result, the rod 8c can be inserted into the rod guide portion 8d1 from the side direction to snap-fit to the rod guide portion 8d1 and to bring the swing member 7 and the lock arms 8 into the compacted subassembly state.

In this embodiment, when the rod 8c is extended so that the rod 8c is slidably held by the rod guide portion 8d1 even in the operation state of the lid lock apparatus, the lock arms are configured in a manner that one of the lock arms 8 can support the other of the lock arms 8, so that the lock arms 8 can be slid more smoothly to each other As described above, various kinds of the engagement structures can be employed as a subassembly member for holding the pair of lock arms 8 in an approached state to each other.

In each of the embodiments, when the length of the lever receiving rib 8j is made longer so that the tip end thereof is extended from the surface of the lid 3 and then the extended portion is pressed by a finger in the right or left direction, the hook portion 8a can be engaged with the engagement groove 2a of the glove box 2 or disengaged therefrom by sliding the lock arm 8. Thus, the apparatus can function as the lid lock apparatus even without the operation lever 5.

Further, as described next, the apparatus can function as the lid lock apparatus even without the return spring 11.

In FIG. 3, when the lever receiving rib 8j is moved in the left side and stopped at the left end in a state where the lid 3 closes the opening portion of the glove box 2, the hook portion 8a moves in the left side and engages with the engagement groove 2a of the glove box 2, whereby the lid 3 closes the opening portion of the glove box 2 thereby to maintain the closed state. Next, when the lever receiving rib 8j is moved in the right side and stopped at the right end, the hook portion 8a engaged with the engagement groove 2a of the glove box 2 also moves in the right side. Thus, since the engagement state is released, the restriction state of the lid 3 is also released and placed in a free state, whereby the lid 3 can be released.

In the case of eliminating the return spring 11 and using the operation lever 5, the lever receiving rib 8j is provided at each of the both sides of the lever portion 5a. In FIG. 3, the restriction and the release of the restriction of the lid 3 and the glove box 2 can be realized when the apparatus is configured in a manner that when the operation lever 5 is pulled, the lever portion 5a abuts against the lever receiving rib 8j on the right side thereby to move the lock arm 8 in the right side, whilst when the operation lever 5 is pushed, the lever portion 5a abuts against the lever receiving rib 8j on the left side thereby to move the lock arm 8 in the left side.

In the embodiments, in the case where the return spring 11 is attached, the hook portion 8a always protrudes through the insertion hole 3f and is retracted from the insertion hole 3f when the operation lever 5 is pulled. In the case where the return spring 11 is not attached, the hook portion 8a stops in a state corresponding to the posture of the operation lever 5 or the position of the lever receiving rib 8j.

What is claimed is:

1. A lid lock apparatus for a glove box, which is attached to the inside of a lid to engage hook portions with the glove box, the lid lock apparatus comprising:
    a swing member, a swing axis of which is swingably supported by a lid of the glove box;
    a pair of lock arms, which are disposed in a symmetrical manner with respect to the swing axis, extend in a horizontal direction, and each includes the hook portion at a tip end thereof, said swing member adapted to position said pair of lock arms in at least one of an extended position and a retracted position; and
    a subassembly member for holding the pair of lock arms at said retracted position without user intervention, wherein:
    the swing member is disposed in a symmetrical manner with respect to the swing axis and includes a pair of cam grooves; and
    the lock arms include cam pins for engaging with the cam grooves to move the lock arms in opposite directions, wherein:
    the swing member includes a lever portion extending in a diameter direction; and
    the subassembly member includes a spring, one end of which is engaged with the lever portion and the other end of which is engaged with the lock arm.

2. The lid lock apparatus for the glove box according to claim 1, wherein the hook portions are biased and engaged with the glove box when the one end of the spring is changed in an engagement destination thereof to the lid from the lever portion.

3. The lid lock apparatus for the glove box according to claim 2, wherein the subassembly member includes rods provided at the lock arms and guide portions provided at the lock arms, for holding the rod of the counterpart lock arm slidably.

4. The lid lock apparatus for the glove box according to claim 3, wherein the rods slide with the guide portions when the hook portions are engaged with the glove box.

5. The lid lock apparatus for the glove box according to claim 1, wherein the lock arm includes a pin, which is pushed by the lever portion to move the lock arms in pulling directions to each other thereby to release the engagement between the hook portion and the glove box.

6. The lid lock apparatus for the glove box according to claim 1, wherein the subassembly member includes rods provided at the lock arms and guide portions provided at the lock arms, for holding the rod of the counterpart lock arm slidably.

7. The lid lock apparatus for the glove box according to claim 6, wherein the rods slide with the guide portions when the hook portions are engaged with the glove box.

8. A lid lock apparatus for a glove box, which is attached to the inside of a lid to engage hook portions with the glove box, the lid lock apparatus comprising:
    a swing member, a swing axis of which is swingably supported by a lid of the glove box;
    a pair of lock arms, which are disposed in a symmetrical manner with respect to the swing axis, extend in a horizontal direction, and each includes the hook portion at a tip end thereof, said swing member adapted to position said pair of lock arms in at least one of an extended position and a retracted position; and
    a subassembly member for holding the pair of lock arms at said retracted position without user intervention, wherein:
    the swing member is disposed in a symmetrical manner with respect to the swing axis and includes a pair of cam grooves; and
    the lock arms include cam pins for engaging with the cam grooves to move the lock arms in opposite directions, wherein the subassembly member includes rods provided at the lock arms and guide portions provided at the lock arms, for holding the rod of the counterpart lock arm slidably.

9. The lid lock apparatus for the glove box according to claim 8, wherein the rods slide with the guide portions when the hook portions are engaged with the glove box.

10. A lid lock apparatus for a glove box, which is attached to the inside of a lid to engage hook portions with the glove box, the lid lock apparatus comprising:
    a swing member, a swing axis of which is swingably supported by a lid of the glove box;
    a pair of lock arms, which are disposed in a symmetrical manner with respect to the swing axis, extend in a horizontal direction, and each includes the hook portion at a tip end thereof, said swing member adapted to position said pair of lock arms in at least one of an extended position and a retracted position; and
    a subassembly member for holding the pair of lock arms at said retracted position without user intervention, wherein:
    the swing member is disposed in a symmetrical manner with respect to the swing axis and includes a pair of cam grooves; and
    the lock arms include cam pins for engaging with the cam grooves to move the lock arms in opposite directions, wherein the subassembly member includes rods provided at the lock arms and engagement portions provided at the lock arms, for snap-fitting with the rod of the counterpart lock arm.

11. A lid lock apparatus for a glove box, which is attached to the inside of a lid to engage hook portions with the glove box, the lid lock apparatus comprising:
a swing member, a swing axis of which is swingably supported by a lid of the glove box;
a pair of lock arms, which are disposed in a symmetrical manner with respect to the swing axis, extend in a horizontal direction, and each includes the hook portion at a tip end thereof, said swing member adapted to position said pair of lock arms in at least one of an extended position and a retracted position; and
a subassembly member for holding the pair of lock arms at said retracted position without user intervention, wherein:
the swing member is disposed in a symmetrical manner with respect to the swing axis and includes a pair of cam grooves; and
the lock arms include cam pins for engaging with the cam grooves to move the lock arms in opposite directions, wherein the subassembly member includes rods provided at the lock arms, guide portions provided at the lock arms, for holding the rod of the counterpart lock arm slidably, and engagement portions for snap-fitting the rods and the guide portions.

12. A lid lock apparatus for a glove box, which is attached to the inside of a lid to engage hook portions with the glove box, the lid lock apparatus comprising;
a swing member, a swing axis of which is swingably supported by a lid of the glove box;
a pair of lock arms, which are disposed in a symmetrical manner with respect to the swing axis, extend in a horizontal direction, and each includes the hook portion at a tip end thereof, said swing member adapted to position said pair of lock arms in at least one of an extended position and a retracted position; and
a subassembly member for holding the pair of lock arms at said retracted position without user intervention, wherein:
the swing member is disposed in a symmetrical manner with respect to the swing axis and includes a pair of cam grooves; and
the lock arms include cam pins for engaging with the cam grooves to move the lock arms in opposite directions, wherein the subassembly member includes rods provided at the lock arms, guide portions provided at the lock arms, for holding the rod of the counterpart lock arm slidably, and engagement portions for snap-fitting the swing member and the lock arm.

* * * * *